United States Patent
Parness et al.

(10) Patent No.: US 12,013,686 B1
(45) Date of Patent: Jun. 18, 2024

(54) ROBOTIC WORKCELL FOR INTERACTING WITH GOODS TO PERSON SYSTEMS

(71) Applicant: Amazon Technologies, Inc., Seattle, WA (US)

(72) Inventors: Aaron Joseph Parness, Mercer Island, WA (US); Sisir Babu Karumanchi, Seattle, WA (US); Joshua Rosenberg Hooks, Seattle, WA (US); Parker Owan, Lake Stevens, WA (US); Rahul Balakrishna Warrier, Kirkland, WA (US); Andres Camilo Cortes Lopez, Seattle, WA (US); Jeongseok Lee, Seattle, WA (US); Curt Salisbury, San Ramon, CA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 17/541,778

(22) Filed: Dec. 3, 2021

(51) Int. Cl.
*G05B 19/418* (2006.01)
*B25J 9/16* (2006.01)

(52) U.S. Cl.
CPC ...... *G05B 19/41815* (2013.01); *B25J 9/1615* (2013.01); *B25J 9/1664* (2013.01); *B25J 9/1682* (2013.01); *B25J 9/1687* (2013.01); *G05B 2219/34348* (2013.01)

(58) Field of Classification Search
CPC ..... G05B 19/41815; G05B 2219/34348; B25J 9/1615; B25J 9/1664; B25J 9/1682; B25J 9/1687
See application file for complete search history.

(56) References Cited

U.S. PATENT DOCUMENTS

| | | | |
|---|---|---|---|
| 10,207,868 B1* | 2/2019 | Stubbs | G06Q 10/087 |
| 10,504,056 B1* | 12/2019 | Stubbs | G06Q 10/087 |
| 10,525,593 B1* | 1/2020 | Shi | B65G 1/04 |
| 10,549,928 B1* | 2/2020 | Chavez | B25J 9/1687 |
| 10,647,528 B1* | 5/2020 | Diankov | B65G 57/02 |
| 10,759,054 B1* | 9/2020 | Patil | B25J 9/1682 |
| 10,793,355 B1* | 10/2020 | Garcia | B25J 9/0096 |
| 2015/0009047 A1* | 1/2015 | Ashkenazi | G08G 1/0175 340/932.2 |
| 2018/0057264 A1* | 3/2018 | Wicks | B65G 1/1376 |
| 2021/0261337 A1* | 8/2021 | Schedlbauer | B65G 1/0492 |

* cited by examiner

*Primary Examiner* — Adam R Mott
*Assistant Examiner* — Matthew C Gammon
(74) *Attorney, Agent, or Firm* — Eversheds Sutherland (US) LLP

(57) ABSTRACT

Techniques and apparatus describe a robotic workcell for performing a robotic stowing operation. The robotic workcell includes a mechanism system, which includes a first robotic gantry, a second robotic gantry, and a controller. The first robotic gantry includes a first mount and a robotic end effector(s) attached to the first mount. The second robotic gantry includes a second mount and at least one end effector attached to the second mount. The controller controls movement of the first mount, the second mount, and the robotic end effector(s), based in part on an analysis of an environment with one or more perception sensors.

18 Claims, 25 Drawing Sheets

ROBOTIC WORKCELL FOR INTERACTING WITH GOODS TO PERSON SYSTEMS

BACKGROUND

The present disclosure relates to a robotic system for stowing items into, or picking items from, a goods to person system, such as containers on a rack.

Many facilities (e.g., warehouses, plants, distribution centers, storehouses, factories, etc.) perform tasks such as stowing items, picking items, shipping items, and the like. Such facilities generally use various transport devices (e.g., carts, containers, pallets, bins, etc.) to transport items to different locations inside and/or outside the facility. As an example, an item may be retrieved from storage and transported to a location in preparation for stowing in a container. In another example, an item can be retrieved (or picked) from a container in preparation for shipping.

Items in a facility are typically stowed in containers and then retrieved a later time to fulfill a customer's order. Items may be stowed randomly, such that the containers may contain many different types of items that have many different sizes. Further, the items may be arranged differently in each container. Because of the wide variety of items being stowed and retrieved, it is difficult to design a robotic system that can reliably stow an item into a container that may already have many different types of items.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
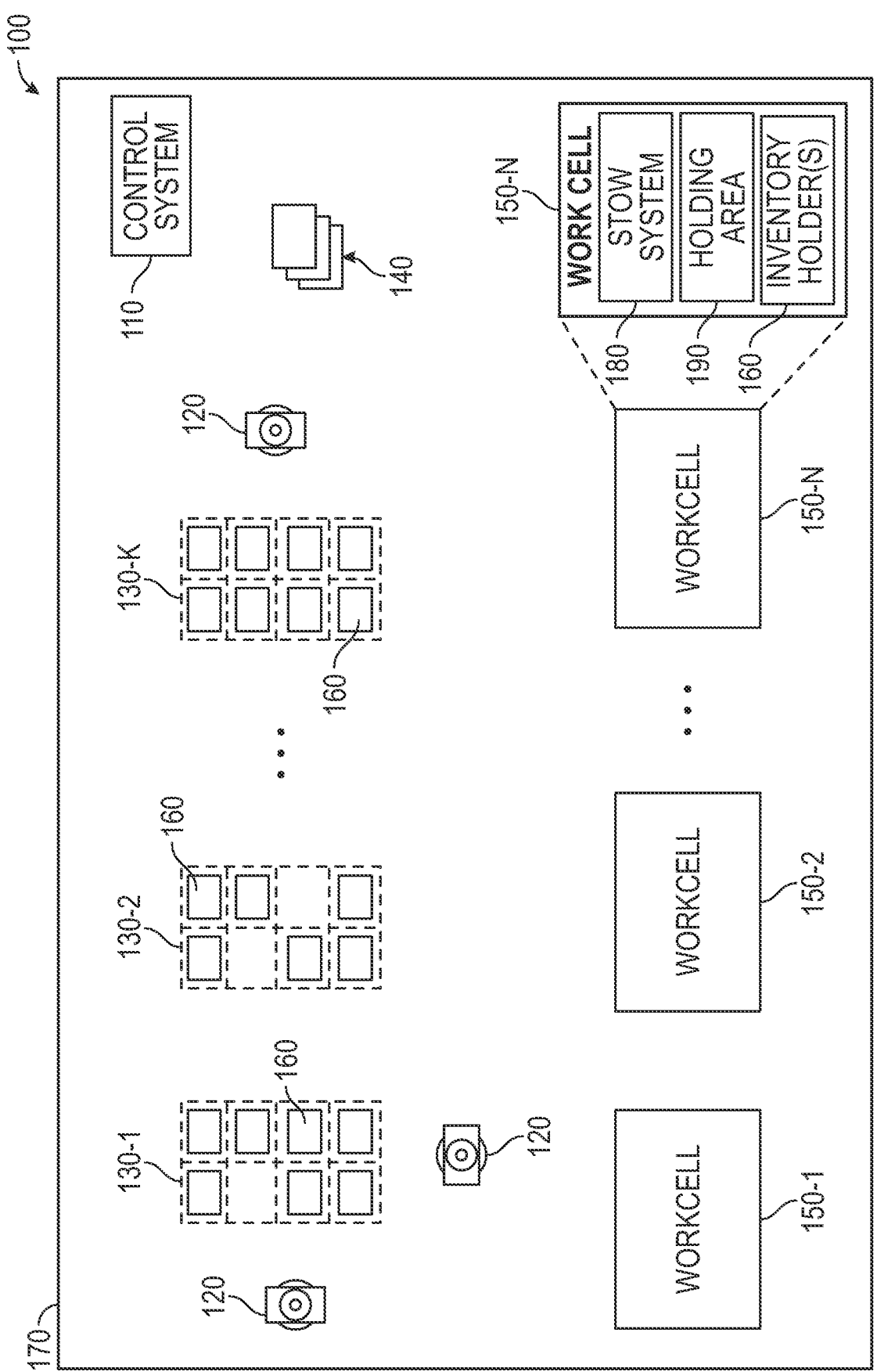
FIG. 1 is a block diagram of an example inventory system, according to one embodiment.

Inventory systems are utilized by many entities for storing and managing inventory. For example, some retailers may utilize a warehouse of goods-to-person systems (also referred to as inventory holders, racks, etc.) that store items in various containers (also referred to as bins, storage locations, etc.). Items may be stowed in the various containers to hold the item(s) in preparation for picking. For example, when an order for a specific item needs to be fulfilled by a retailer, the item can be picked (or retrieved) from the container where the item is stowed.

Inventory systems according to embodiments described herein use a robotic system to stow an item into a goods-to-person system, such as a rack (or inventory holder) having multiple containers. In one embodiment, the robotic system includes multiple robotic gantries that permit various sensors, tools, or end effectors to interact with one or more containers supported by the rack, where each container may have any number of items. For example, the robotic system can use one or more of the robotic gantries to move the sensors, tools, or end effectors to a particular container to stow an item into the container.

In some embodiments, the containers include retaining elements—e.g., an elastic band or flap—that secures the items in the containers. In these embodiments, the mechanical system can include an access tool for displacing (or opening) the retaining element of a particular container so that a stow tool of the robotic system can stow the item into the container. The access tool may be supported by a robotic gantry that can move the access tool to a particular container and the stow tool may be supported by another robotic gantry that can move the stow tool to the particular container.

In one embodiment, the stow tool includes a robotic end effector that supports one or more different types of tools/end effectors. For example, the robotic end effector may support a grabber tool (or end effector) that is configured to grasp an item from a holding area, transition the item to a container, and insert (or place) the item into the container. In one embodiment, the grabber tool includes two plates (or faceplates) configured to interact with an item. The grabber tool can grasp an item by engaging (e.g., squeezing) the item between the two plates or providing a support surface underneath the item to support the weight of the item, while using the plates to maintain the item's orientation. In one embodiment, the plates can be designed to be as large as the faces (or surfaces) of the item being grasped by the plates. For example, the dimensions of each plate facing an item being grasped may be greater than or equal to the dimensions of the respective item surface in contact with the plate.

The robotic end effector may also support a spacer tool (or end effector) that is configured to create space to stow an item in a container, which may already have a number of (stowed) items. For example, the spacer tool can be configured to rearrange (e.g., manipulate, displace, shift, etc.) currently stowed items in the container, so that the grabber tool can place another (new) item into the container. As described below, in one particular embodiment, the spacer tool may include a flat shaped end effector that is inserted into the container and that pushes the items to one side of the container, thereby creating space for a new item to be stowed in the container. In some embodiments, the grabber tool may also be configured to rearrange currently stowed items in the container in order to create space for a new item to be stowed.

The robotic end effector may also support a plunging tool (or end effector) that is configured to push an item into a space of a container that is created via the spacer tool and/or grabber tool. In one embodiment described below, the plunging tool may be disposed between the two plates of the grabber tool and may extend between the plates, applying force to an item grasped by the grabber tool in order to push the item into the created space.

In some embodiments, the robotic system includes perception sensors, which can be used to identify occupied and unoccupied space in the containers, identify an arrangement of items in the containers, the number of items in the containers, the types of items in the containers, and the like. The robotic system may use this information to determine which container to stow an item in, the location within the container to stow an item in, whether to create a space within a container, the type of motion primitive to use to create the space within the container, etc. As used herein, a motion primitive may refer to a motion strategy that the robotic system uses to interact with the environment. Examples of motion strategies include, but are not limited to, a slot wedge motion, a bin sweep motion, a page turn motion, etc.

Note that as used herein, an "item" may refer to an individual item, multiple items, a package containing an individual item, a package containing multiple items, etc. As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 is a block diagram of an example inventory system 100, according to one embodiment. The inventory system 100 may be located in a facility (e.g., warehouse, factory, distribution center, etc.). The inventory system 100 includes a control system 110, one or more drive units 120 (also referred to as autonomous surface vehicles, autonomous robotic vehicles, mobile drive units, etc.), one or more holding areas 130 1-K, one or more inventory holder 160 (also referred to as a rack), and one or more workcells 150 1-N (also referred to as robotic workcells, robotic stowing stations, or stowing stations) within a workspace 170.

The inventory system 100 is capable of moving inventory items between locations within the workspace 170 to facilitate the entry, processing, and/or removal of inventory items from the inventory system 100 and the completion of other tasks involving the inventory items. Here, for example, the workspace 170 represents an area associated with the inventory system 100 in which the drive units can move and/or the inventory holders 160 can be stored. In one particular embodiment, the workspace 170 may represent all or part of the floor of a fulfillment center in which the inventory system 100 operates. Although FIG. 1 shows, for the purposes of illustration, an embodiment of the inventory system 100 in which the workspace 170 includes a fixed, predetermined, and finite physical space, particular embodiments of the inventory system 100 may include drive units 120 and inventory holders 160 that are configured to operate within a workspace 170 that is variable dimensions and/or of an arbitrary geometry. Similarly, while FIG. 1 illustrates a particular embodiment of the inventory system 100 in which the workspace 170 is entirely enclosed in a building, alternative embodiments may utilize workspaces 170 in which some or all of the workspace 170 is located outdoors, which a vehicle (such as a cargo ship), or otherwise unconstrained by any fixed structure.

The control system 110 assigns tasks to appropriate components of the inventory system 100, and coordinates operation of the various components in completing the tasks. These tasks may relate to the movement and processing of inventory items, including but not limited to, stowing items into one or more containers of one or more inventory holders 160 in preparation for picking operations, shipping operations, etc. For example, the control system 110 can generate and transmit task assignments 140 (or commands) to selected components to trigger completion of the relevant tasks. Each task assignment 140 defines one or more tasks to be complete by a particular component. The tasks may relate to the retrieval, storage, movement, stowing, etc., of inventory items. Depending on the component and task to be completed, a particular task assignment 140 may identify locations, components, and/or actions associated with the corresponding tasks and/or any other appropriate information to be used by the relevant component in completing the assigned task.

With respect to the drive units 120 specifically, the control system 110 may, in particular embodiments, communicate task assignments 140 to selected drive units 120 that identify one or more destinations for the selected drive units 120. For example, the control system 110 may communicate a task assignment 140 that identifies (and defines) the location of an inventory holder 160 within a holding area 130 (e.g., holding area 130-1). The task assignment 140 may instruct the drive unit 120 to retrieve the inventory holder 160 within the holding area, to transition (or move) the inventory holder 160 to a workcell 150 (e.g., workcell 150-1 or another location), and to hold (or park) the inventory holder 160 within the workcell 150 until receiving another task (or command). In some embodiments, the task assignment 140 may instruct the drive unit 120 to transition the inventory holder 160 to another location after the robotic stowing operation is completed.

Although shown in FIG. 1 as a single, discrete component, the control system 110 may represent multiple components and may represent or include portions of other elements of the inventory system 100 (e.g., workcell 150). As a result, any or all of the functionality of the control system 110 that is described herein may, in particular embodiments, represent functionality of a workcell 150 (e.g., a controller (or control system)) within the workcell 150).

Each of the inventory holders 160 stores inventory items of the inventory system 100. In a particular embodiment, the inventory holders 160 include multiple containers (or storage bins), with each container capable of holding one or more types of inventory items. The inventory holders 160 are capable of being carried, rolled, and/or otherwise moved by the drive units 120. The inventory items represent any objects suitable for storage, retrieval, and/or processing in the inventory system 100. For the purposes of this description, "inventory items" may represent any one or more objects of a particular type that are stored in the inventory system 100. Thus, a particular inventory holder 160 is currently "storing" a particular inventory item if the inventory holder 160 currently holds one or more units of that type. As one example, the inventory system 100 may represent a mail-order warehouse facility, and inventory items may represent merchandise stored in the mail-order warehouse facility. During operation, the drive units 120 may retrieve the inventory holders 160 containing one or more inventory items that are requested in an order to be packed for delivery to a customer, or retrieve inventory holders 160 carrying pallets containing aggregated collections of inventory items for shipment. Moreover, in particular embodiments of the inventory system 100, boxes containing completed orders may themselves represent inventory items.

The workcells 150 represent locations designated for the completion of stowing operations, which can include the introduction of inventory items into the inventory holders 160. In some embodiments, one or more workcells 150 represents a location at which the inventory system 110 is externally accessible by human operator(s) and/or robotic system(s) external to the inventory system 100. By virtue of the multiple workcells 150, items can be transitioned (or inducted) to different workcells or specific workcells that are designated to handling specific types of items. For example, one or more of the workcells 150 may be designated for handling items of a certain size, items associated with a particular shipping location, etc. In some embodiments, certain items may be diverted away from particular workcells 150 when the items satisfy certain conditions (e.g., the items may be too large for a particular workcell).

In one embodiment, each workcell 150 includes a (robotic) stow system 180, a holding area 190, and one or more inventory holders 160. As noted, the inventory holder(s) 160 may be transitioned into a particular workcell 150 by one or more drive units 120. The stow system 180 is a robotic system that is configured perform an automated stowing operation, e.g., by grasping items from the holding area 190 and placing the items into containers of an inventory holder 160. The holding area 190 is representative of a variety of surfaces and can have any form factor suitable for holding items (e.g., table, floor, pallet, conveyor belt, container, tote, etc.). In one embodiment, the holding area 190 may include a conveyor (including a conveyor belt) that transitions items to the workcell 150 in preparation for a stowing operation.

The stow system 180 can include hardware components, software components, or combinations thereof. As described below, in some embodiments, the stow system 180 includes multiple robotic gantries that are configured to (1) move sensors, tools, or end effectors to the holding area 190 to grasp an item from the holding area 190 and (2) move the sensors, tools, or end effectors to a particular container to stow the item into the container. Note the stow system 180 is described in more detail below with respect to FIG. 2. Note that the inventory system 100 depicted in FIG. 1 is a reference example of a system in which the robotic workcell described herein can be deployed and that the robotic workcell can be used in other systems and/or environments (e.g., grocery stores, retail stores, etc.).

Figure 2:
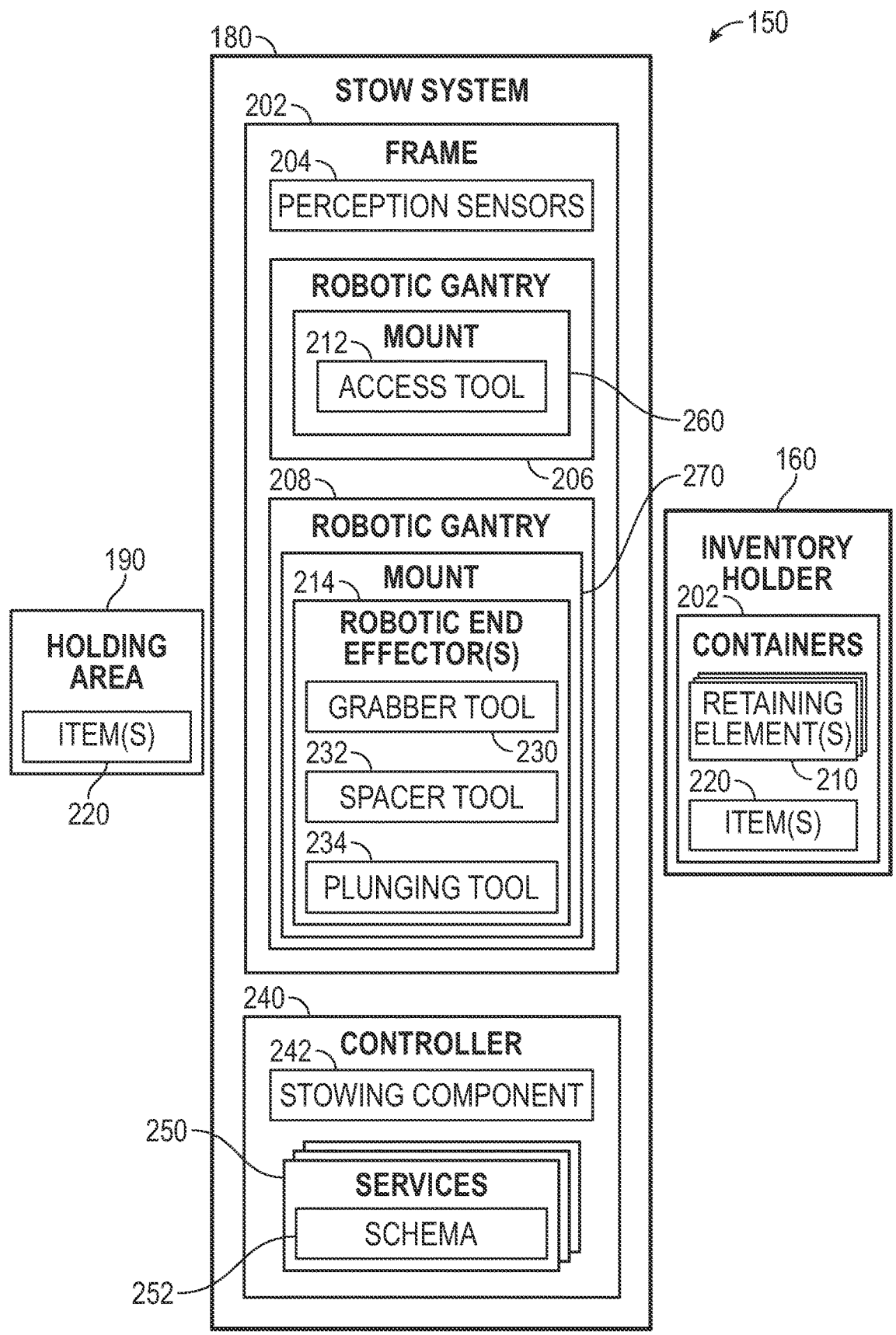
FIG. 2 is a block diagram of a workcell, according to one embodiment.

FIG. 2 is a block diagram of a workcell 150, according to one embodiment. Although one workcell 150 is depicted, there may be any number of workcells 150 located in a given facility. The holding area 190 includes one or more items 220 that are available to be stowed (via the stow system 180) into containers 202 of the inventory holder 160. In some embodiments, the inventory holder 160 can have containers 202 on multiple sides which can be accessed via a drive unit 120 (not shown in FIG. 2) spinning the inventory holder 160 so that each side of the inventory holder 160 can face the stow system 180. In one embodiment, the drive unit 120 can move the inventory holder to a position proximate to the stow system 180, e.g., to enable the tools or end effectors of the robotic gantries to stow items into the containers 202.

As shown in this particular embodiment, the stow system 180 of the workcell 150 includes a frame 202, which can support one or more perception sensors 204, a robotic gantry 206, and a robotic gantry 208. The robotic gantry 206 can provide multiple degrees of freedom for extending the workspace of various tools or end-effectors attached to the robotic gantry 206. In one embodiment, the robotic gantry 206 provides two-axis motion (e.g., vertical and horizontal) so that the mount 260 can be moved to any location within a two-dimensional (2D) plane established by the horizontal and vertical sides of the robotic gantry 206. That is, a bottom, horizontal side of the robotic gantry 206 can move the vertical side of the robotic gantry 206 in the horizontal direction, thereby changing the horizontal displacement of the mount 260 (which is attached to the vertical side). In parallel, the vertical side can move the mount 260 up and down. In this manner, the robotic gantry 206 can move the mount 260 (and various elements supported by the mount 260) in a 2D area.

Similarly, the robotic gantry 208 can provide multiple degrees of freedom for extending the workspace of various tools or end-effectors attached to the robotic gantry 208. In one particular embodiment, the robotic gantry 208 provides two-axis motion so that the mount 270 can be moved to any location within a 2D plane established by the horizontal and vertical sides of the robotic gantry 208. In this manner, the robotic gantry 208 can move the mount 270 (and various elements supported by the mount 270) in a 2D area.

The robotic gantries 206, 208 can include one or more perception sensors 204, tools, and/or end effectors to enable the stow system 180 to grasp an item 220 from the holding area 190 and stow the item 220 into one of the containers 202 of the inventory holder 160. Here, for example, the robotic gantry 208 includes a robotic end effector 214, which is attached to (or supported by) the mount 270. The robotic end effector 214 is representative of a variety of different types of robotic components, including, for example, robotic arms, linearly movable components, components having a single degree of freedom, components having multiple degrees of freedom, etc.

In one embodiment, the robotic end effector 214 includes a grabber tool 230, which is configured to grasp an item 220 from the holding area 190. In one particular embodiment, the grabber tool 230 includes two plates, which can engage an item 220 by squeezing the item 220 between the two plates. Additionally, the robotic end effector 214 can use the grabber tool 230 to insert a grasped item 220 into a location within the container 202. In embodiments where the grabber tool 230 includes two plates, the grabber tool 230 can change an orientation of the two plates in order to insert the item 220 into the container 202. After inserting the item 220 into the container 202, the grabber tool 230 can open the two plates, allowing the grabber tool 230 to retract while the item 220 stays in its stowed position. More details describing an EOAT with two plates for grasping and stowing an item into a container can be found in U.S. patent application Ser. No. 17/039,253, filed Sep. 30, 2020, which is expressly incorporated by reference herein in its entirety for all purposes.

In one embodiment, the robotic end effector 214 includes a spacer tool 232, which can create space for stowing an item into the container 202. For example, if the container 202 is densely packed (e.g., there is little empty space due to currently stowed items), the robotic end effector 214 can use the spacer tool 232 to create space in the container 202. In one embodiment, the spacer tool 232 may be configured to shift items to one side of the container 202, create space between two items in the container 202, etc. In general, the spacer tool 232 can perform various different motion primitives in order to rearrange currently stowed items in the container 202 to create space in the container. In one embodiment, the spacer tool 232 includes a flat shaped end effector (e.g., a plate) which can be inserted into the container and can manipulate items. In another embodiment, the spacer tool 232 can include two plates, which can be inserted into the container 202 in order to create space for a new item. More details describing a spacer tool for creating space for stowing an item into a container can be found in U.S. patent application Ser. No. 17/037,068, filed Sep. 29, 2020, which is expressly incorporated by reference herein in its entirety for all purposes.

In one embodiment, the robotic end effector 214 includes a plunging tool 234, which can aid in inserting an item into a container 202 and/or aid in keeping an item stowed by the grabber tool 230 within the container 202. For example, in one particular embodiment, the plunging tool 234 can extend between two plates of the grabber tool 230 and engage a grasped item. The plunging tool 234 may apply a force to the grasped item, such that the grasped item is inserted into the container 202. The plunging tool 234 may continue applying the force to the inserted item, while the grabber tool 230 is retracted from the container 202. In this manner, embodiments can reduce chances of the stowed item being accidently pulled out with the grabber tool 230. More details describing a plunging tool can be found in U.S. patent application Ser. No. 17/039,253, filed Sep. 30, 2020, which is expressly incorporated by reference herein in its entirety for all purposes.

In some embodiments, at least some of the containers 202 (of an inventory holder 160) may include retaining element(s) 210 that secure the items within the containers 202. For example, the retaining element(s) 210 may be disposed at an opening of the containers 202 to reduce the chance the items in the container 202 fall out, such as when the drive unit 120 is moving the inventory holder 160. In these scenarios, if the inventory holder 160 is jostled or accelerated, the items are less likely to fall from the containers 202. At the same time, the retaining element(s) 210 may also block the one or more other end effectors (e.g., grabber tool 230, spacer tool 232, plunging tool 234, etc.) from interacting with item(s) in the container and/or block one or more perception sensors 204 from capturing an accurate view or image of the inside of the container 202.

Accordingly, in some embodiments, the robotic gantry 206 includes an access tool 212, which is attached to (or supported by) the mount 260. In embodiments where a retaining element(s) 210 blocks access to a container 202 and/or obstructs the field of view of the perception sensor(s) 204, the access tool 212 can displace the retaining element(s) 210 by, e.g., grabbing, pushing, or opening the retaining element so that the retaining element no longer blocks the other end effectors and/or the field of view of the perception sensor(s) 204. After an item 220 is stowed into a container 202, the access tool 212 can release or reengage the retaining element 210 so that the items remaining in the container 202 are less likely to fall out of the container. More details describing retaining elements and an access tool configured to displace retaining elements can be found in U.S. patent application Ser. No. 17/037,068, filed Sep. 29, 2020, which is expressly incorporated by reference herein in its entirety for all purposes.

The perception sensor(s) 204 may include a visual sensor (e.g., camera), depth sensor, infrared sensor, barcode reader, force sensing sensor, pressure sensor, gyroscope, accelerometer, or combinations thereof. The perception sensor 204 can be any sensor (or combination of sensors) that permits the stow system 180 (or components of the stow system) to identify items in a holding area 190, identify the type or number of items in the holding area 190, identify occupied versus empty/unoccupied space in a container 202, identify the arrangement of items in the container 202, identify the type or number of items in the container, identify the individual items in the container 202, determine an orientation of the robotic end effector 214, determine an amount of force to apply to an item (via the robotic end effector 214), and the like.

The stow system 180 can include multiple perception sensors 204, disposed at different angles and locations to provide different views of the various components within the workcell 150. For example, a first set of perception sensors 204 may be disposed in a set of locations within the workcell 150 to provide a view of the holding area 190, a second set of perception sensors 204 may be disposed in a set of locations within the workcell 150 to provide a view of the inventory holder 160 (including views of the various containers 202), etc.

The stow system 180 also includes a controller 240 for controlling the stow system 180. The controller 240 includes a stowing component 242, which is configured to implement one or more techniques described herein for performing a robotic stowing operation. The stowing component 242 can include hardware components, software components, or combinations thereof. In one embodiment, the stowing component 242 can determine the occupied space within one or more containers 202 of an inventory holder, determine the amount of unoccupied space within the container(s) 202, predict the amount of space that can be created in the container(s) 202, and select a particular container 202 to stow a given item, based at least in part on the amount of unoccupied space, the amount of space that can be created, attributes of the item (e.g., size, dimensions, fragility, etc.), etc.

In one embodiment, the stowing component 242 may control (or coordinate) the operations of multiple different sensors, tools, or end effectors in order to stow a given item into a container 202. For example, the stowing operation may involve operations from multiple different system services 250, which can include, for example, a sensor manager service, container perception service, grasp perception service, container item match service, motion planner service, robot controller service, gantry controller service, oriental controller service, visualization service, etc. Each system service 250 may host code that implements the functions of the system service 250. In one embodiment, the system service 250 may run in a software container (e.g., docker container), which may be defined by a software image (e.g., docker image). Note, however, that the system services 250 are not limited to docker environments and that the system services 250 can be implemented using a variety of different software techniques/frameworks.

Each system service 250 includes a schema 252, which defines the functions that the system service 250 performs, defines the location of data in the data plane that can be consumed by the functions of the system service 250 (e.g., function read operations), the location of data in the data plane that is written by the functions of the system service 250 (e.g., function write operations), etc.

Figure 3:
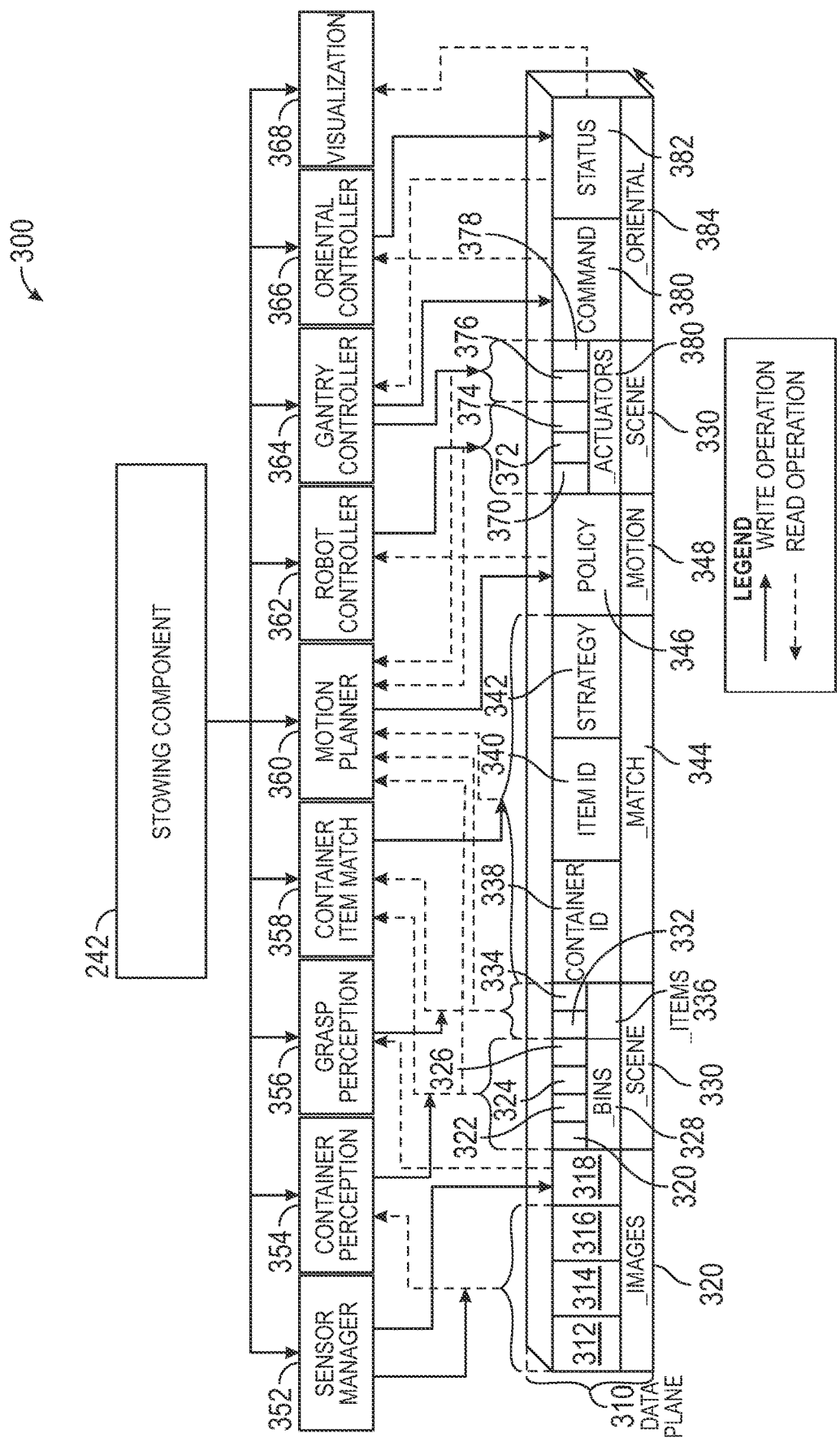
FIG. 3 illustrates an example control plane architecture for implementing a robotic stowing operation, according to one embodiment.

FIG. 3 illustrates an example architecture 300 of system services 250 interacting with each other via a control data plane (also referred to as a hub) in order to perform a robotic stowing operation, according to one embodiment. In this particular embodiment, the system services 520 include a sensor manager service 352, a container perception service 354, a grasp perception service 356, a container item match service 358, a motion planner service 360, a robot controller service 362, a gantry controller service 364, an oriental controller service 366, and visualization service 368. Note, however, that in other embodiments, the stow system 180 can include different services and/or different number of services for performing a robotic stowing operation.

The stowing component 242 may trigger operations from each of the system services 352-368 by, e.g., calling functions (also referred to as "Verbs") specific to each system service. The function write operations may be defined in the schema (e.g., schema 252) for each system service. As the stowing component 242 triggers operations from the system services 352-368, messages may be passed between the system services 352-368 and the data plane 310. The messages, for example, may include data to be written into the data plane 310 as a result of a function write operation and/or data to be read from the data plane 310 as a result of a function read operation. In one embodiment, the data plane 310 stores a buffer of past data. The data may be streamed to a unique directory for each stow cycle.

In this particular embodiment, the sensor manager service 352 can control operation of the perception sensors 204. For example, the sensor manager service 352 can trigger one or more of the perception sensors 204 to capture sensor data of the environment in the field of view of the respective perception sensor 204. Here, for example, the sensor manager service 352 may be configured to control a (first) perception sensor 204-1 (e.g., top (height) camera of robotic gantry 206/208), a (second) perception sensor 204-2 (e.g., middle (height) camera of robotic gantry 206/208, a (third) perception sensor 204-3 (e.g., bottom (height) camera of robotic gantry 206/208, and a (fourth) perception sensor 204-4 (e.g., camera disposed on robotic end effector 214).

The sensor manager service 352 may trigger the perception sensors 204 1-4 to capture sensor data (e.g., images) of the environment in their respective field of view for each robotic stow cycle. The sensor manager service 352 may store the captured images in a directory 320 (e.g., "_images") within the data plane 310. Here, for example, the sensor manager service 352 stores images 312 captured by perception sensor 204-1, images 314 captured by perception sensor 204-2, images 316 captured by perception sensor 204-3, and images captured by perception sensor 204-4.

The container perception service 354 is generally configured to analyze (or perceive) a state of the containers 202 within the inventory holders 160. For example, the container perception service 354 can analyze sensor data to determine a number of empty containers 202, identify unoccupied space within the containers 202, determine a number of items within each container 202, determine one or more attributes (e.g., size, dimensions, fragility, orientation, compressibility, etc.) of the items within each container 202, etc. In this particular example, the container perception service 354 may analyze the state of the containers 202, based on sensor data obtained from the data plane 310. For example, the container perception service 354 may perform a read operation (based on functions defined in its schema) to obtain sensor data captured by the first, second, and third perception sensors 204 1-3.

Based on the sensor data (e.g., images 312, 314, and 316) obtained from the data plane 310, the container perception service 354 may identify a set of candidate (or potential) container locations available for stowing an item. These candidate container locations can include containers that satisfy a predetermined condition (e.g., number of existing items is less than a threshold, amount of unoccupied space satisfies a threshold, etc.). In this particular example, the container perception service 354 identifies four candidate container locations 320, 322, 324, and 326. The container perception service 354 may store an identifier associated with each candidate container location 320, 322, 324, and 326 in the data plane 310. For example, the identifiers can be stored within a (sub)-directory 328 (e.g., "bins") within a directory 330 (e.g., "_scene").

The grasp perception service 356 is generally configured to analyze (or perceive) a state of the holding area 190 within the workcell 50. For example, the grasp perception service 356 can analyze sensor data to determine a number of items within the holding area 190, one or more attributes (e.g., size, dimensions, orientation, fragility, compressibility, etc.) of the items within the holding area, etc. In this particular example, the grasp perception service 356 may analyze the state of the holding area 190, based on sensor data obtained from the data plane 310. For example, the grasp perception service 356 may perform a read operation (based on functions defined in its schema) to obtain sensor data captured by the fourth perception sensor 204-4.

Based on the sensor data (e.g., images 318), the grasp perception service 356 can determine a set of candidate items available for grasping and stowing into a container. The candidate items may include items that satisfy a predetermined condition (e.g., the item is currently the only item that needs to be stowed, the item has a size below a threshold, etc.). In this particular example, the grasp perception service 356 identifies two candidate items 332 and 334. The grasp perception service 356 may store an identifier (e.g., item ID) associated with each item 332, 334 in the data plane 310. For example, the identifiers can be stored within a (sub)-directory 336 within the directory 330 (e.g., "_scene").

The container item match service 358 is generally configured to determine (or select) a container (from the candidate set of candidate locations) to stow an item. In particular, the container item match service 358 can match an item within the holding area 190 to one of the containers 202. In this particular example, the container item match service 358 can perform a read operation (based on functions defined in its schema) to obtain the candidate container locations 320, 322, 324, and 326 and the item identifiers 332, 334 from the data plane 310. The container item match service 358 may evaluate this information with one or more machine learning techniques to determine a particular container ID 338, item ID 340, and a strategy 342. The strategy 342 may include an indication of whether to create a space within the container ID 338 (e.g., the container ID 338 may have existing items stowed within the container), the type of motion primitive to use to create the space within the container ID 338. For example, the motion primitive can include a slot wedge motion, a bin sweep motion, a page turn motion, etc. The container item match service 358 may store the container ID 338, item ID 340, and the strategy 342 under a directory 344 (e.g., "_match") within the data plane 310.

The motion planner service 360 is generally configured to generate a motion policy 346 for stowing the item ID 340 into the container ID 338. The motion policy 346 generally indicates how the various tools and end effectors of the stow system 180 should be controlled for the stowing operation. For example, the motion policy 346 can indicate how to move the robotic gantry 206, access tool 212, robotic gantry 208, robotic end effector 214 (including grabber tool 230, spacer tool 232, plunging tool 234), etc. The motion policy 346 may specify the planned control for the entire stowing operation, from grasping of an item from the holding area 190, to creating space within a container for insertion of an item, to inserting the item within the container, etc.

The motion planner service 360 may obtain control parameters and configuration information (collectively referred to as configuration information) from the various tools and end effectors from the data plane 310. Here, for example, the motion planner service 360 can perform a read operation (e.g., based on functions defined in its schema) to obtain configuration information 370 associated with the robotic gantry 206, configuration information 372 associated with the robotic end effector 214, configuration information 374 associated with the various tools/end-effectors of the robotic end effector 214 (e.g., grabber tool 230, spacer tool 232, plunging tool 234, etc.), configuration information 376 associated with the robotic gantry 208, and configuration information 378 associated with the access tool 212 from the (sub)-directory 380 (e.g., "_actuators") of the directory 330 (e.g., "_scene") within the data plane 310. The motion planner service 360 may additionally perform a read operation to obtain the information within the directory 344 and the information with the (sub)-directories 328 and 336. The motion planner service 360 may evaluate the obtained information using one or more machine learning techniques in order to generate the policy 346.

The robot controller service 362 is generally configured to control operation of tools/end effectors of the stow system 180, based on the policy 346. As shown, given the policy 346, the robot controller service 362 may control the various tools/end effectors by updating one or more of the configuration information 370, 372, and 374 within the data plane 310. Similarly, the gantry controller service 364 is generally configured to control operation of the robotic gantries 206/208 by updating one or more of the configuration information 376 and 378. The oriental controller service 366 is generally a motor controller that can control motors (or actuators) of the robotic gantries 206/208. Here, for example, the oriental controller service 366 may read command(s) 380 in the data plane 310 from the gantry controller service 362 and update a status 382 of the oriental controller in the data plane 310. The command(s) 380 and status 382 may be stored within a directory 384 (e.g., "_oriental"). In one embodiment, the visualization service 368 may allow an operator to determine the status of the stow system 180 (e.g., via the status 382 of the oriental controller service 366).

Figure 4A:
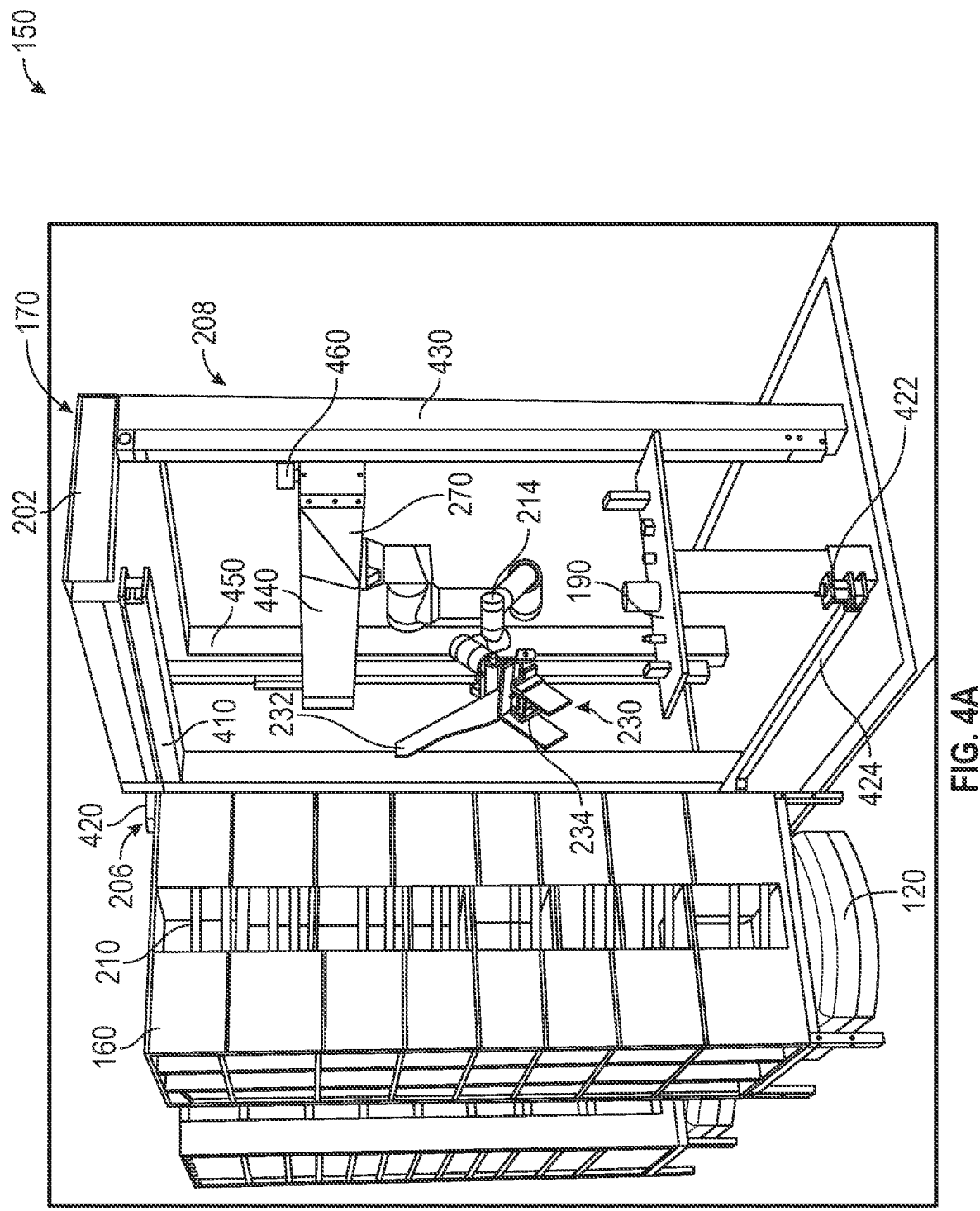
FIGS. 4A-C illustrate different views of an example robotic workcell, according to one embodiment.
Figure 4B:
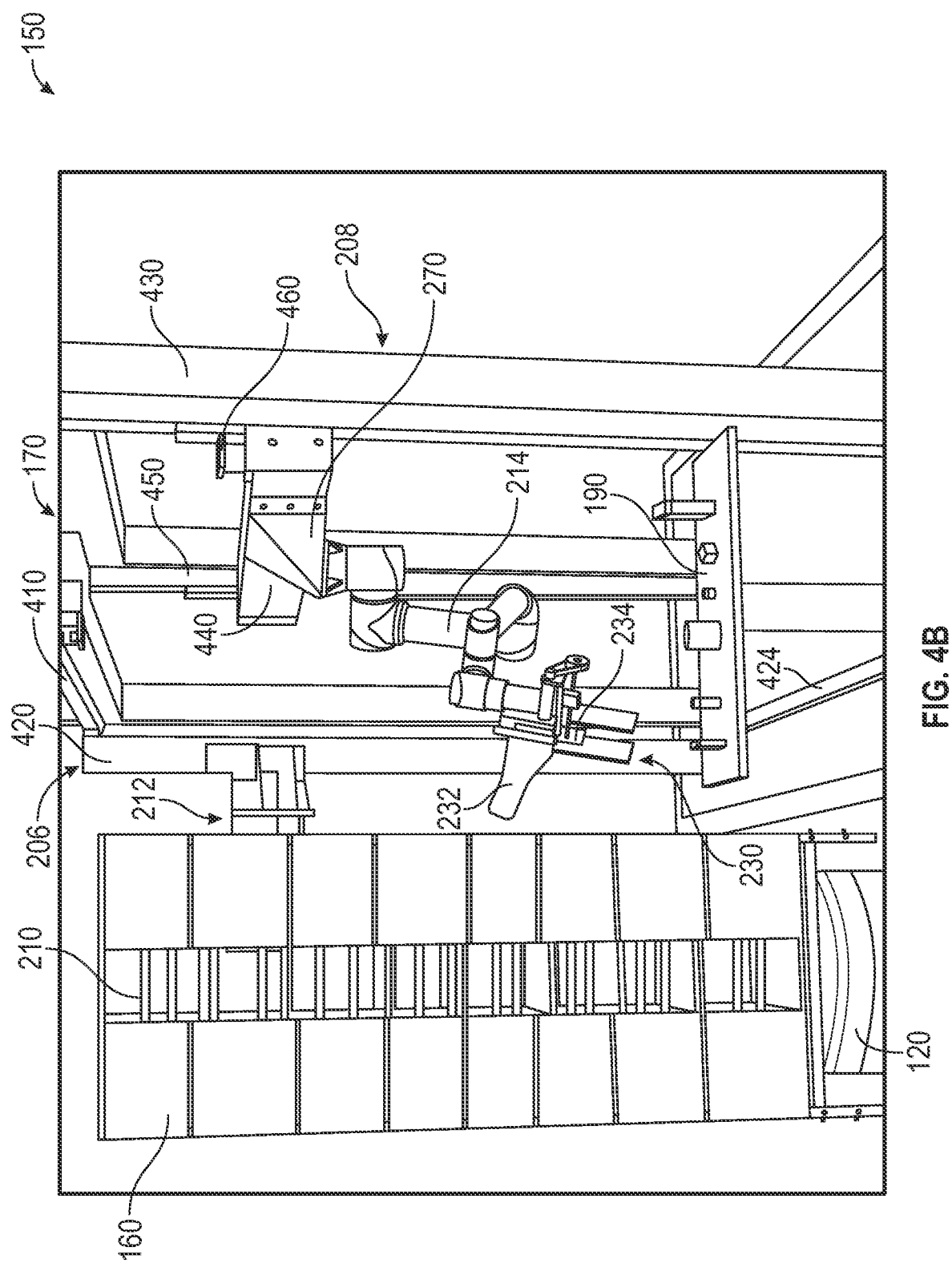
Figure 4C:
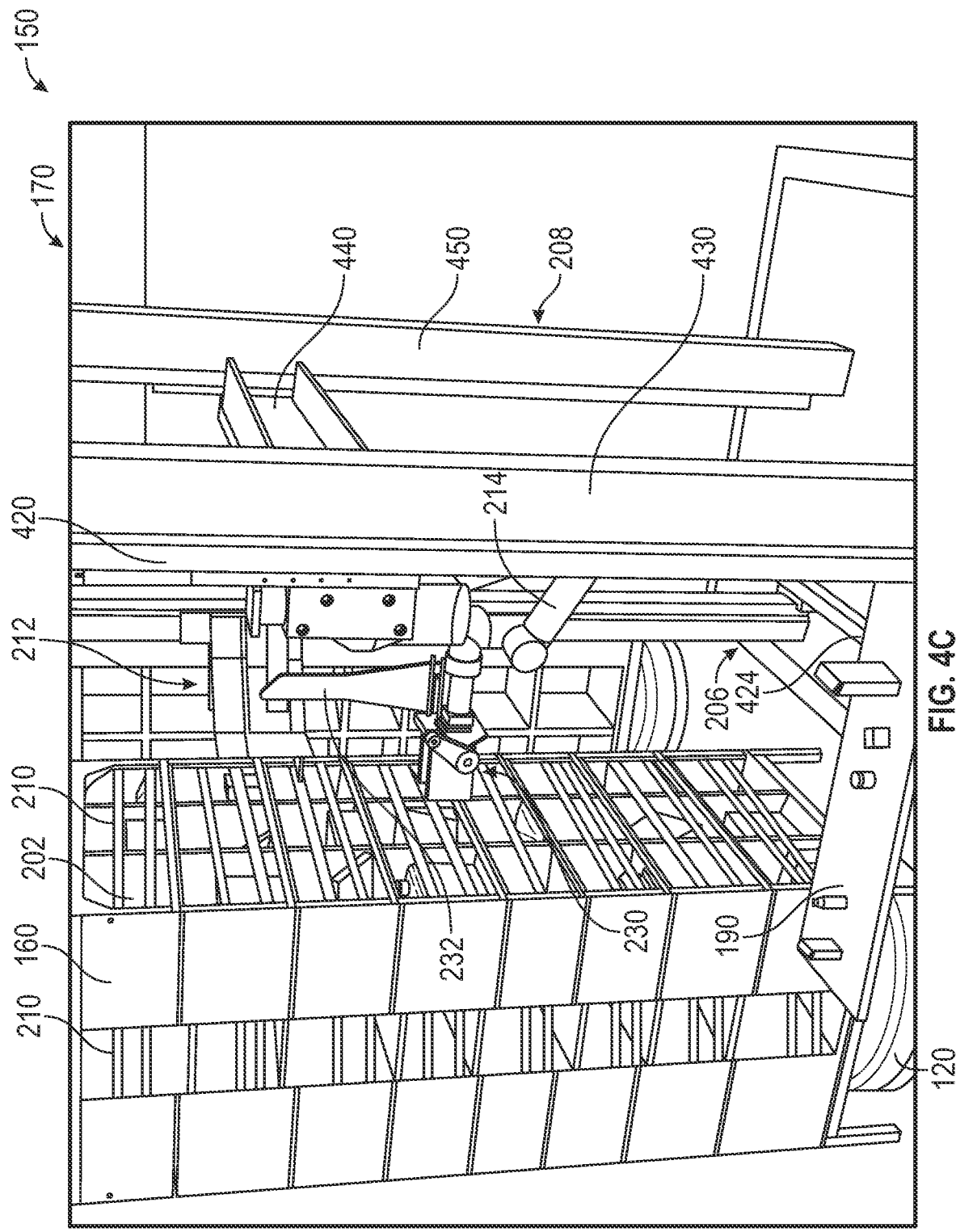

FIGS. 4A-4C illustrate different views of an example robotic workcell 150, according to one embodiment. In particular, FIGS. 4A, 4B and 4C illustrate different perspective views of the robotic workcell 150.

As shown in this particular embodiment, the robotic workcell 150 includes an inventory holder 160, which is implemented as a rack having multiple shelves of containers 202 on each side of the rack (FIGS. 4A and 4B), a stow system 180 (FIGS. 4A, 4B, and 4C), and a holding area 190 (FIGS. 4A, 4B, and 4C). One or more of the shelves of the inventory holder can include retaining elements 210 for securing items within the containers 202. In one embodiment, a drive unit 120 may retrieve the inventory holder 160 from a location in a facility and transport the inventory holder 160 to a location in the robotic workcell 150 that is accessible to one or more components of the stow system 180.

The stow system 180 includes a robotic gantry 206, which provides multiple degrees of freedom of operation (e.g., two degrees of freedom), so that the access tool 212 can be moved to any location within a 2D plane. Here, for example, the robotic gantry 206 includes a horizontal member 410, a horizontal member 424, and a vertical member 420 having one end attached to the horizontal member 410 and another end attached to the horizontal member 424. The robotic gantry 206 may also include one or more actuators (or motors). For example, the robotic gantry 206 may include actuator(s) (e.g., actuator 422) that move the vertical member 420 (which supports the mount 260 (shown in FIG. 2) in the horizontal direction along a length of the horizontal members 410 and 424. In parallel, the robotic gantry 206 may include actuator(s) that move the mount (e.g., mount 260), which supports the access tool 212, in a vertical direction (e.g., up and down) along the vertical member 420.

The stow system 180 also includes a robotic gantry 208, which provides multiple degrees of freedom of operation, so that one or more robotic end effectors 214 (and various tools attached to the robotic end effectors) can be moved to any location within a plane established by the robotic gantry 208. The robotic gantry 206 may be disposed between the robotic gantry 208 and the inventory holder 160. Here, the robotic gantry 208 includes a vertical member 430, a horizontal member 440, and a vertical member 450. The horizontal member 440 has one end attached to the vertical member 440 and another end attached to the vertical member 450. The horizontal member 440 supports a mount 270, which has one or more robotic end effectors 214 attached to it. In this particular embodiment, one of the robotic end effectors 214 includes the grabber tool 230, a spacer tool 232, and a plunging tool 234. Note, however, in other embodiments, the robotic end effector 214 can include a different set of tools/end effectors. The robotic gantry 208 may include one or more actuators (or motors) for moving the horizontal member 440 in the vertical direction (e.g., up and down) established by the vertical members 430, 450. Similarly, the robotic gantry 208 can include an actuator (e.g., actuator 460) that moves the mount 270 in the horizontal direction established by the horizontal member 440.

The stow system 180 also includes perception sensors 204 located in different locations. For example, the stow system 180 may include perception sensor(s) 204 on the robotic gantry 206, perception sensor(s) 204 on the robotic gantry 208, perception sensor(s) 204 on the mount 270, perception sensor(s) 204 on the holding area 190, etc. In one embodiment, the movement of the robotic gantry 206/208, the robotic end effector 214, and the various end effectors may be coordinated (e.g., by the stowing component 242). In one embodiment, the movement of the robotic gantry 206/208, the robotic end effector 214, and the various end effectors may be independently controlled (e.g., by the stowing component 242).

Figure 5:
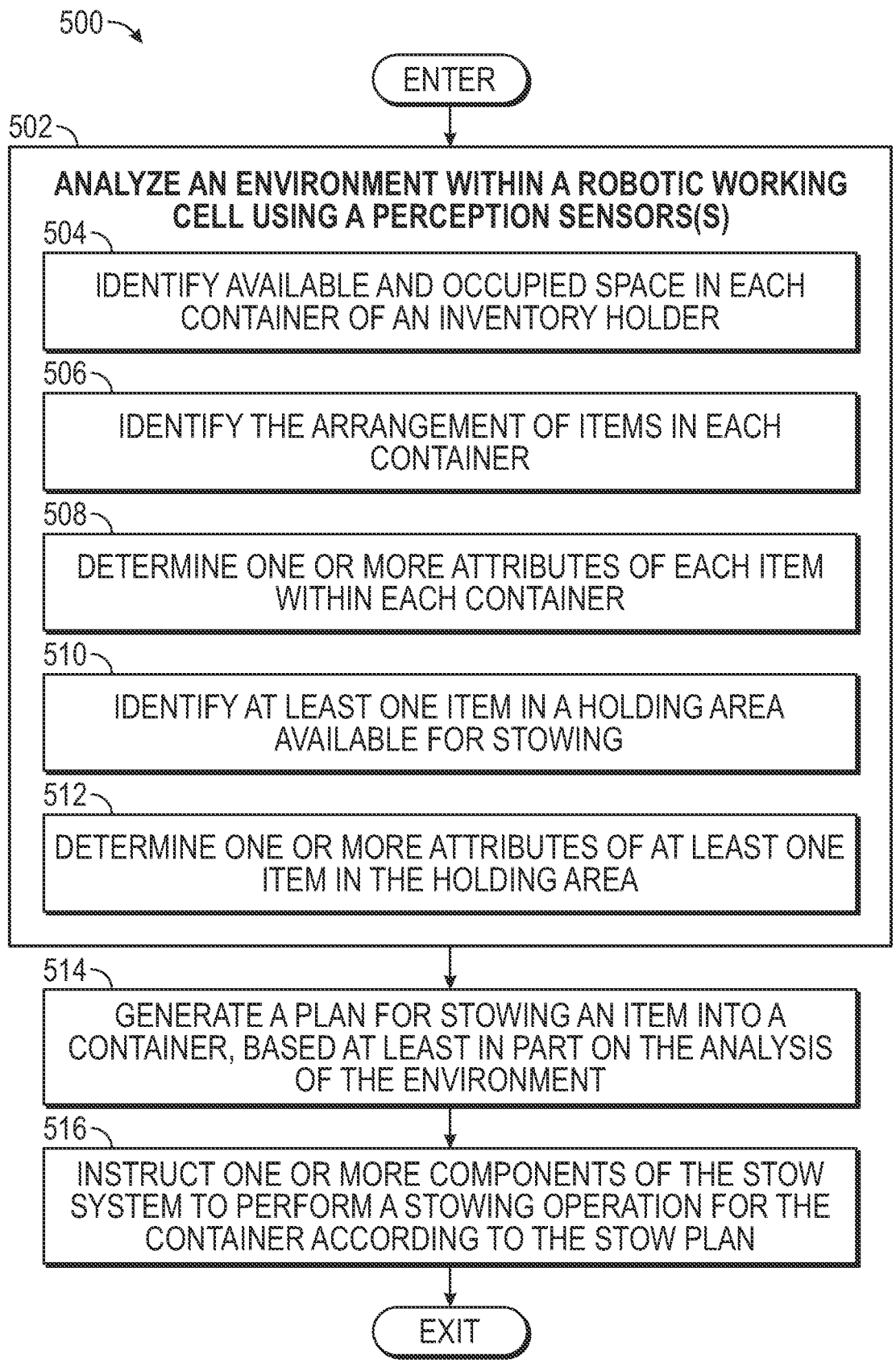
FIG. 5 is a flowchart of a method for performing a robotic stowing operation, according to one embodiment.

FIG. 5 is a flowchart of a method 500 for performing a robotic stowing operation according to one embodiment. The method 500 may be performed by one or more components of a robotic workcell (e.g., robotic workcell 150). In one embodiment, the method 500 is performed by one or more components (e.g., controller 240) of a stow system (e.g., stow system 180).

Method 500 may enter at block 502, where the stow system analyzes an environment in the robotic workcell using one or more perception sensors (e.g., perception sensor(s) 204). The robotic workcell may include at least one inventory holder (e.g., inventory holder 160) having multiple containers (e.g., containers 202) and a holding area (e.g., holding area 190) storing at least one item available for being stowed into the containers. The stow system may rely on a plurality of perception sensors that may be the same type (e.g., multiple cameras) or different types (e.g., a camera and a depth sensor).

The perception sensor(s) may be attached (or located) in various different locations within the robotic workcell. For example, a first set of perception sensor(s) may be attached on the external frame (e.g., frame 202) of the stow system, a second set of perception sensor(s) may be attached to one or more of the robotic gantries (e.g., robotic gantry 206/208), a third set of perception sensor(s) may be attached to the robotic end effector (e.g., robotic end effector 214), a fourth set of perception sensor(s) may be attached to the various tools/end effectors (e.g., access tool 212, grabber tool 230, spacer tool 232, plunging tool 234, etc.).

In one embodiment, the sensor data captured by the perception sensor(s) is analyzed by a computer processor (e.g., controller 240) and a software application (e.g., stowing component 242, services 250, etc.). The software application may perform image processing and/or employ machine learning techniques to identify areas or items of interest in a captured image and/or depth map. The stow system can use this information to provide instructions and movement commands to components of the stow system (e.g., gantries 206/208, robotic end effector 214, access tool 212, grabber tool 230, spacer tool 232, plunging tool 234, etc.) described herein to perform a stow operation.

Block 502 includes five sub-steps 504, 506, 508, 510, and 512 that can be performed by the stow system. Note that block 502 may be implemented by performing any one of (or combination of) sub-steps 504, 506, 508, 510, and 512. At block 504, the stow system can use the sensor data captured by the perception sensor(s) to identify available and occupied space in each container of the inventory holder. This information may be useful when choosing a location to stow an item. For example, the stow system can determine whether a container is suitable for stowing an item based in part on the amount of available space and/or the amount of occupied space. In some embodiments, the stow system can determine whether a space (or slot) can be created in a given container, based in part on the amount of available space and/or the amount of occupied space.

At block 506, the stow system identifies the arrangement of items in each container. This information may be useful to determine where to stow an item, to determine how to potentially move the already stowed items in order to free up additional space for stowing a new item. For example, if the items (e.g., thin cases) are stacked horizontally, or some items are stacked vertically while others are stacked at an angle, the stow system may determine that a larger contiguous space can be created by stacking all the items vertically. In this example, the stow system can use the spacer tool and/or grabber tool to rearrange the items so that a space sufficient for stowing the new item is created.

At block 508, the stow system determines one or more attributes of each item within each container. The item attribute(s) can include, but are not limited to, item ID, dimensions, size, weight, type of package (if any) the item is enclosed in, whether the item and/or package is compressible (e.g., clothing, a package with bubble wrap), whether the item is fragile, etc. The stow system may use the item attributes as one of the inputs when determining whether to potentially move already stowed items in order to free up additional space for stowing a new item and/or determining how to move the already stowed items in order to free up the additional space.

At block 510, the stow system identifies at least one item in a holding area available for stowing. At block 512, the stow system determines one or more attributes of the at least one item (e.g., item ID, dimensions, weight, type of package (if any) the item is enclosed in, whether the item and/or package is compressible, etc.) in the holding area. As described below, the stow system may use this information when determining which container is most suitable for stowing the item.

At block 514, the stow system generates a plan for stowing the at least one item into a container, based at least in part on the analysis of the environment. For example, as described below, the stow system can determine which of the containers is most suitable for stowing the at least one item, based in part on the item attributes of the item to be stowed, the item attributes of the already stowed items within the containers, arrangement of the already stowed items within the containers, amount of available space/occupied space within the containers, etc. At block 516, the stow system instructs one or more components of the stow system to perform a stowing operation for the container according to the stow plan. The method 500 may then exit.

Figure 6:
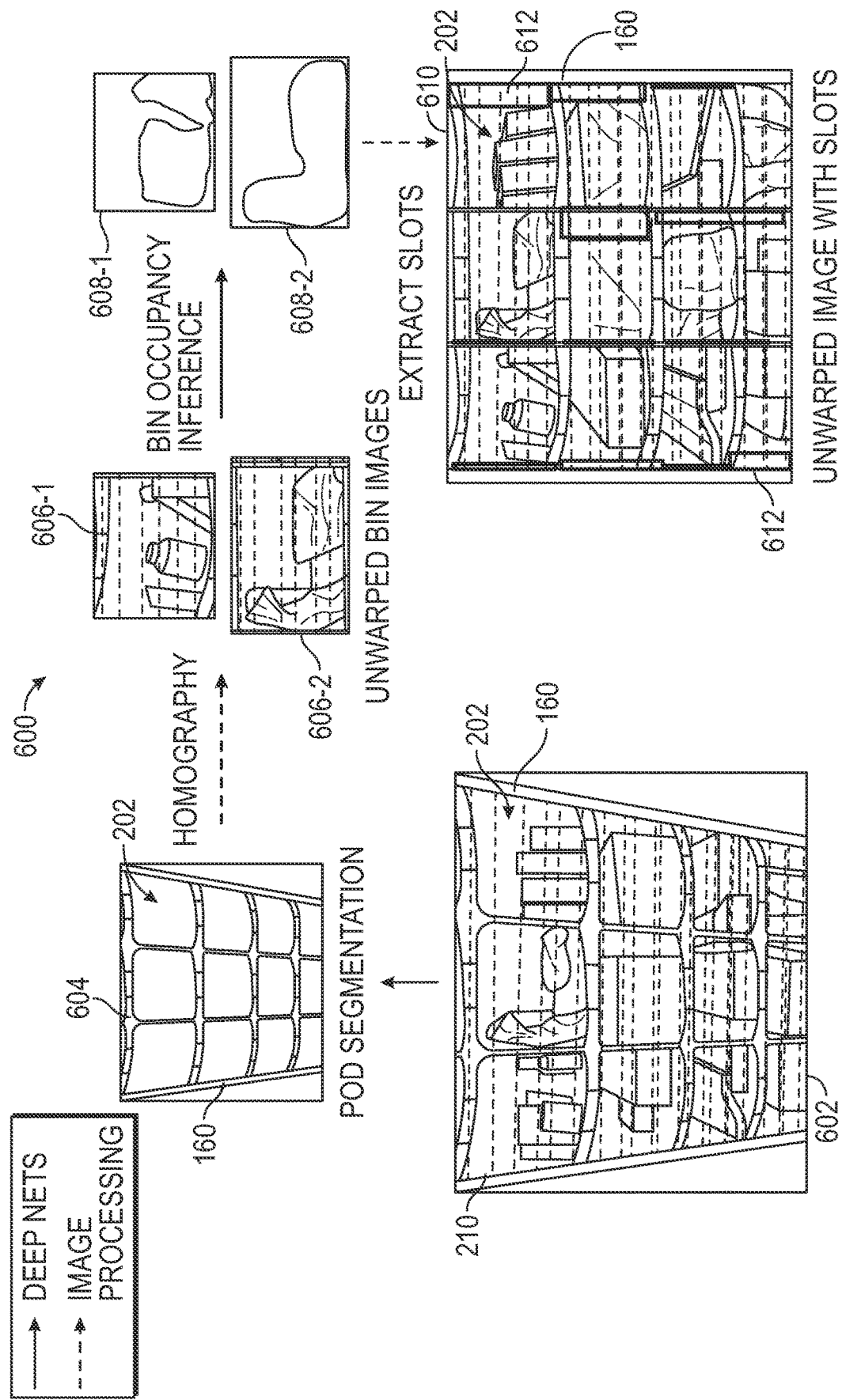
FIG. 6 illustrates an example workflow for identifying occupied and unoccupied space within containers of an inventory holder, according to one embodiment.

FIG. 6 illustrates an example workflow 600 for identifying available and occupied space within containers of an inventory holder, according to one embodiment. In one embodiment, the workflow 600 can be used to implement the operations in block 504 of method 500 illustrated in FIG. 5. As shown, the stow system may obtain (e.g., via perception sensor(s) 204) an image 602 of an inventory holder 160 having multiple containers 202. The stow system may use segmentation techniques (e.g., semantic segmentation, instance segmentation, etc.) to identify each container 202 within the image 602. Here, for example, the stow system can generate an image 604 indicating the segment of the inventory holder 160 (e.g., an "inventory holder-level" or "pod-level" image). In one embodiment, the segmentation techniques may be implemented a variety of deep neural networks.

The stow system may employ image processing (e.g., homography) on the image 604 to generate a set of "bin-level" images 606 1-2. The stow system may then run an occupancy inference (e.g., using deep neural networks) on each of the "bin-level" images 606 1-2 to generate the images 608 1-2, where each image 608 indicates the unoccupied space and occupied space within the image 608. The stow system may then use imaging processing techniques on the images 608 to extract the available slots 612 of unoccupied space within each container 202. As shown, the stow system may generate an image 610 having an indication of the slots 612 within one or more of the containers 202.

Figure 7:
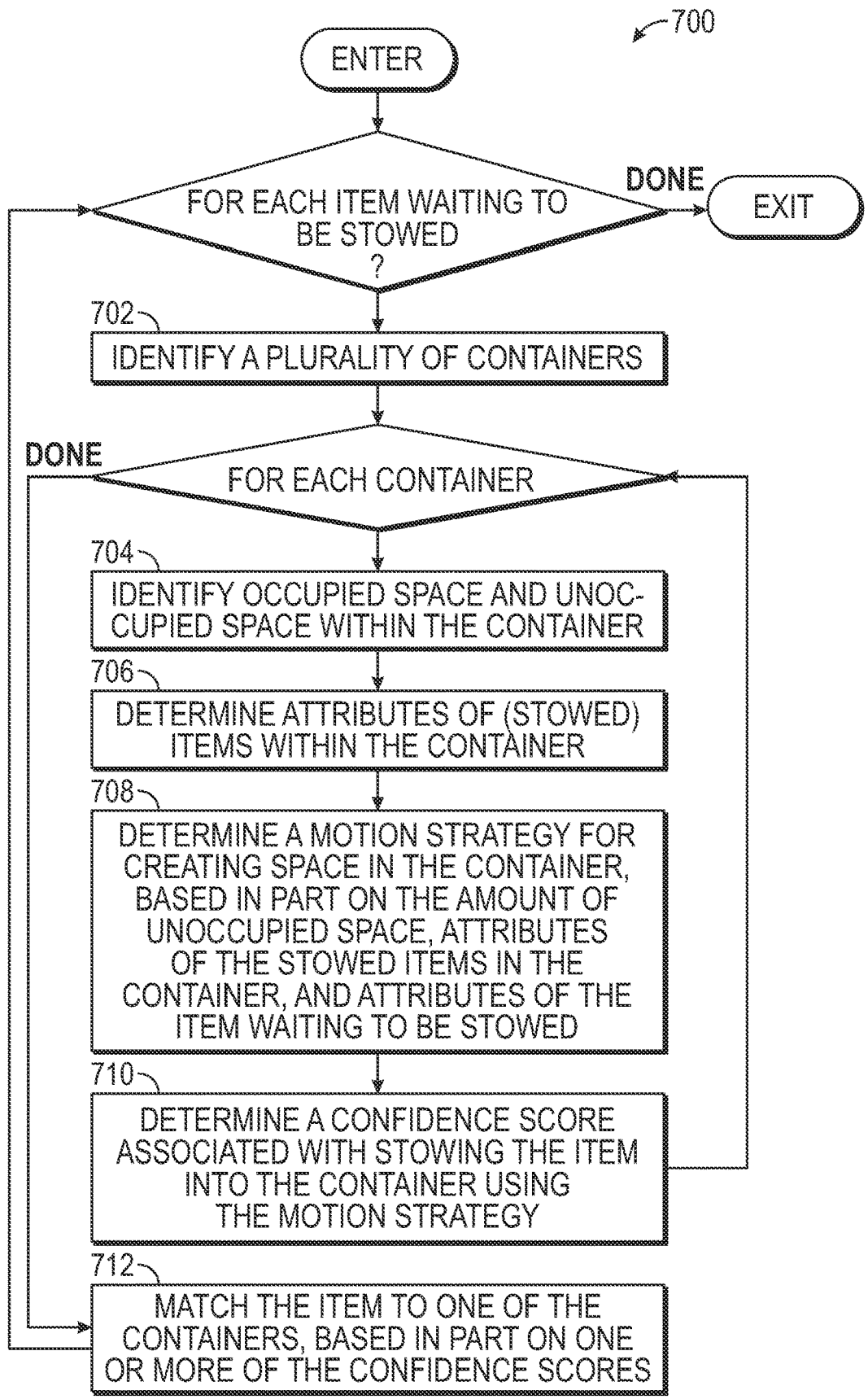
FIG. 7 is a flowchart of a method for matching an item waiting to be stowed to a container, according to one embodiment.

FIG. 7 is a flowchart of a method 700 for matching an item (e.g., item 220) waiting to be stowed to a container (e.g., container 202), according to one embodiment. The method 700 may be performed by one or more components of a robotic workcell (e.g., robotic workcell 150). In one embodiment, the method 700 is performed by one or more components (e.g., controller 240) of a stow system (e.g., stow system 180). The method 700 may be performed for each iteration of a robotic stow cycle (e.g., for each item that is waiting to be stowed).

At the start of a robotic stow cycle, the stow system may identify a plurality of containers within a robotic workcell (block 702), using one or more perception sensors (e.g., perception sensors 204). In one embodiment, the plurality of containers may be arranged on an inventory holder (e.g., inventory holder 160). The method 700 may then perform the operations in blocks 704, 706, 708, and 710 for each of the containers. At block 704, the stow system identifies occupied space and unoccupied space within each container of the plurality of containers. In one embodiment, the stow system can use a combination of image processing techniques and deep learning techniques (e.g., deep neural networks) to identify the occupied space and unoccupied space within each container, e.g., as shown in the workflow 600 illustrated in FIG. 6.

At block 706, the stow system determines attributes of (stowed) items within the container. In one embodiment, the stow system may determine one or more of the attributes of the (stowed) items, based on the known item IDs associated with the (stowed) items. As noted, the attributes can include, but are not limited to, size, dimensions, weight, etc. In some embodiments, the stow system can determine one or more of the attributes of the (stowed) items based on sensor data captured by the perception sensor(s). For example, the stow system can determine, from sensor data (e.g., image) captured of the container, an arrangement of the (stowed) items within the container. For instance, the stow system can determined whether one or more (stowed) items are stacked in a vertical (standing up) configuration, stacked in a horizontal (laying down) configuration, tilted configuration, etc.

At block 708, the stow system determines a motion strategy for creating space in the container, based in part on the amount of unoccupied space, attributes of the stowed items in the container, and attributes of the item waiting to be stowed. The motion strategy indicates the motion the stow system should use to interact with the (stowed) items within the container in order to create a space sufficient for stowing the item waiting to be stowed. In one embodiment, the motion strategy may be a slot wedge motion, which can be used to create a space between two items that is sufficient for stowing the item waiting to be stowed. In another embodiment, the motion strategy may be a page turn motion, which can be used to rearrange an item from a first stacked configuration (e.g., vertical or horizontal) to a second stacked configuration (e.g., horizontal or vertical). In another embodiment, the motion strategy may be a bin sweep motion, which can be used to sweep an item(s) to one side of the container, reducing the amount of space (or gap) between the sweeped items and/or the amount of space between the sweeped items and the side of the container.

In some embodiments, the stow system may generate the motion strategy to create space in the container for the item waiting to be stowed. For example, in these embodiments, the stow system may determine that that unoccupied space is insufficient for storing the item waiting to be stowed. In some cases, the stow system may determine the unoccupied space is insufficient when the amount of unoccupied space is less than a threshold. This threshold may be based on one or more attributes of the item waiting to be stowed. For example, if the item waiting to be stowed has a size that would not fit into the amount of unoccupied space, then the stow system may determine the unoccupied space is insufficient for storing that item.

In other examples, the stow system may determine the unoccupied space is insufficient due to the arrangement of the (stowed) items. For example, while a total amount of the unoccupied space may be sufficient for stowing the item waiting to be stowed into, there may not be a large enough contiguous amount of the unoccupied space sufficient for stowing the item due to the arrangement of the (stowed) items. The amount of contiguous unoccupied space can be reduced due to, e.g., gaps between one or more (stowed) items within the container, gaps between (stowed) items and a side of the container, items stacked in a particular configuration (e.g., vertical, horizontal, inclination) with respect to other items in the container, and so on.

In some embodiments, the stow system may generate the motion strategy to create space in the container for another item waiting to be stowed (e.g., another item for a subsequent stow cycle). In these embodiments, the stow system may determine that the unoccupied space is sufficient is sufficient for stowing the current item waiting to be stowed, but may not be sufficient for one or more next items in queue.

At block 710, the stow system determines a confidence score associated with stowing the item into the container using the motion strategy. In one embodiment, the confidence score is a prediction of the feasibility that using the motion strategy will lead to successful stowing of the item in the container.

After determining the confidence score associated with stowing the item into each container, the stow system matches the item to one of the containers, based in part on one or more of the confidence scores. In one embodiment, the stow system (at block 712) can match the item to the container having the highest associated confidence score. In another embodiment, the stow system (at block 712) can match the item to a container that does not have a highest confidence score among the multiple containers. In this embodiment, for a given set of items, the stow system can match each item to maximize the probability of stowing success across the set of items. In these instances, the stow system may have to match an item to a container that has a lower confidence score (out of the set of confidence scores) in order to increase the likelihood of other items in the set of items being successfully matched. The method 700 may then exit.

Figure 8A:
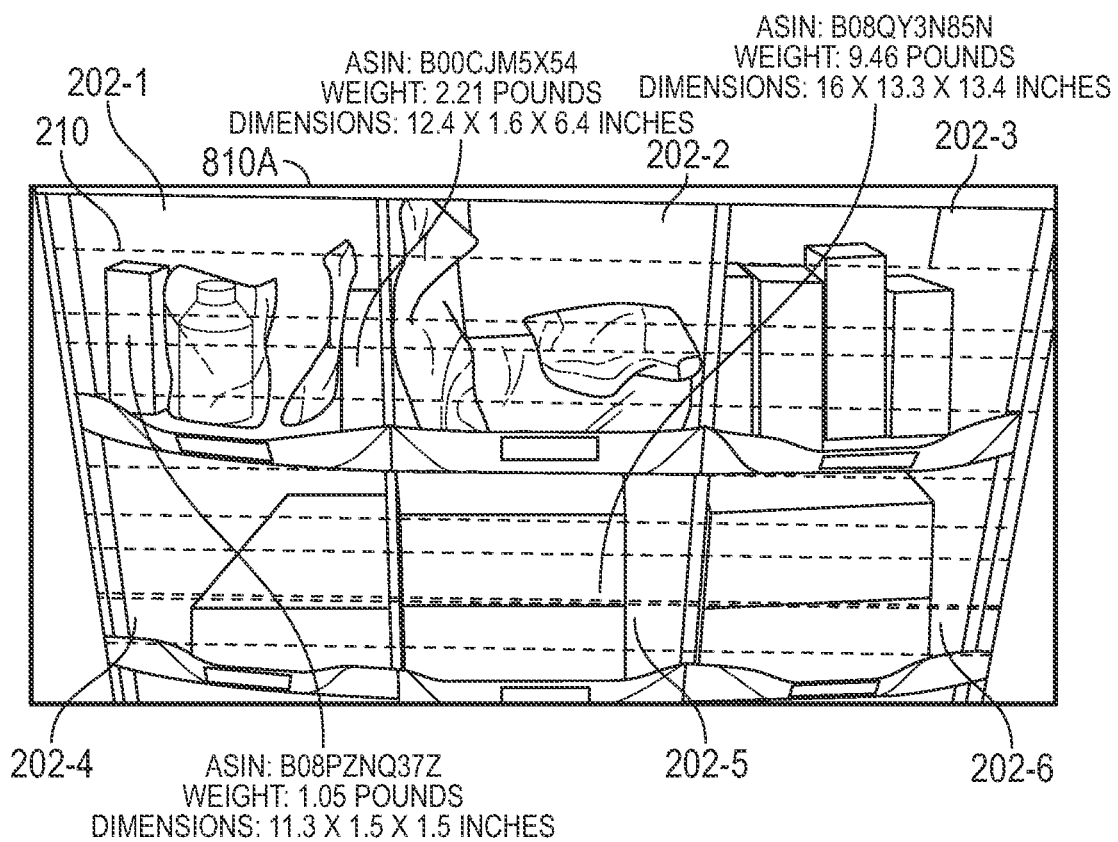
FIGS. 8A-8E illustrate an example sequence of matching items to containers as part of a robotic stowing operation, according to various embodiments.
Figure 8B:
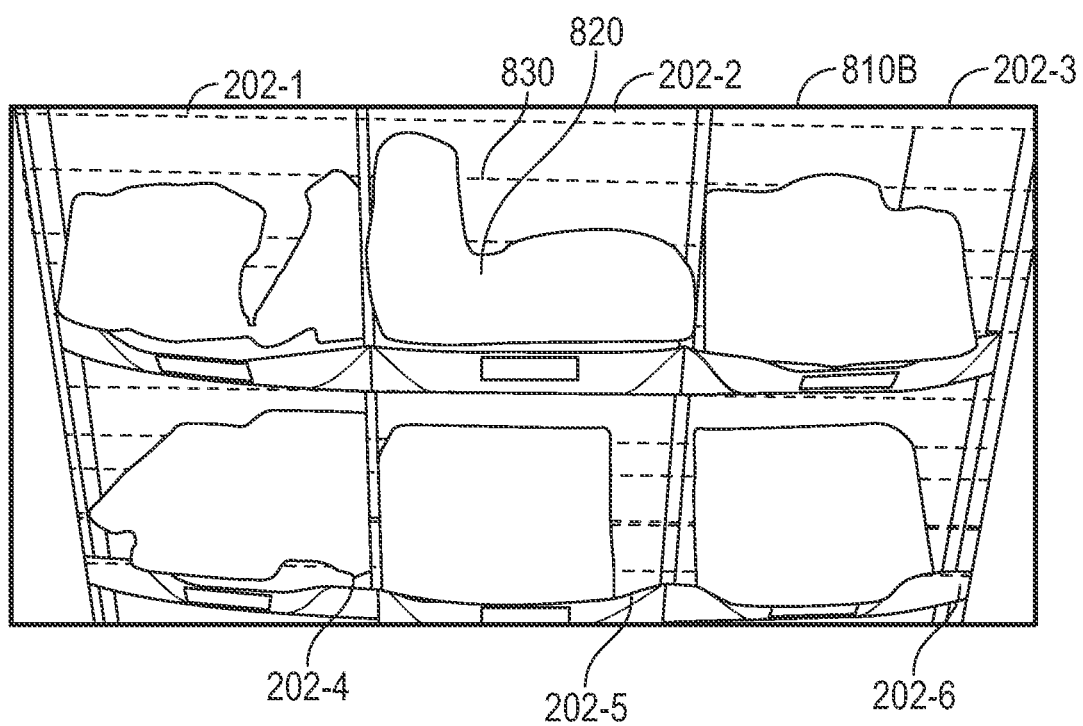
Figure 8C:
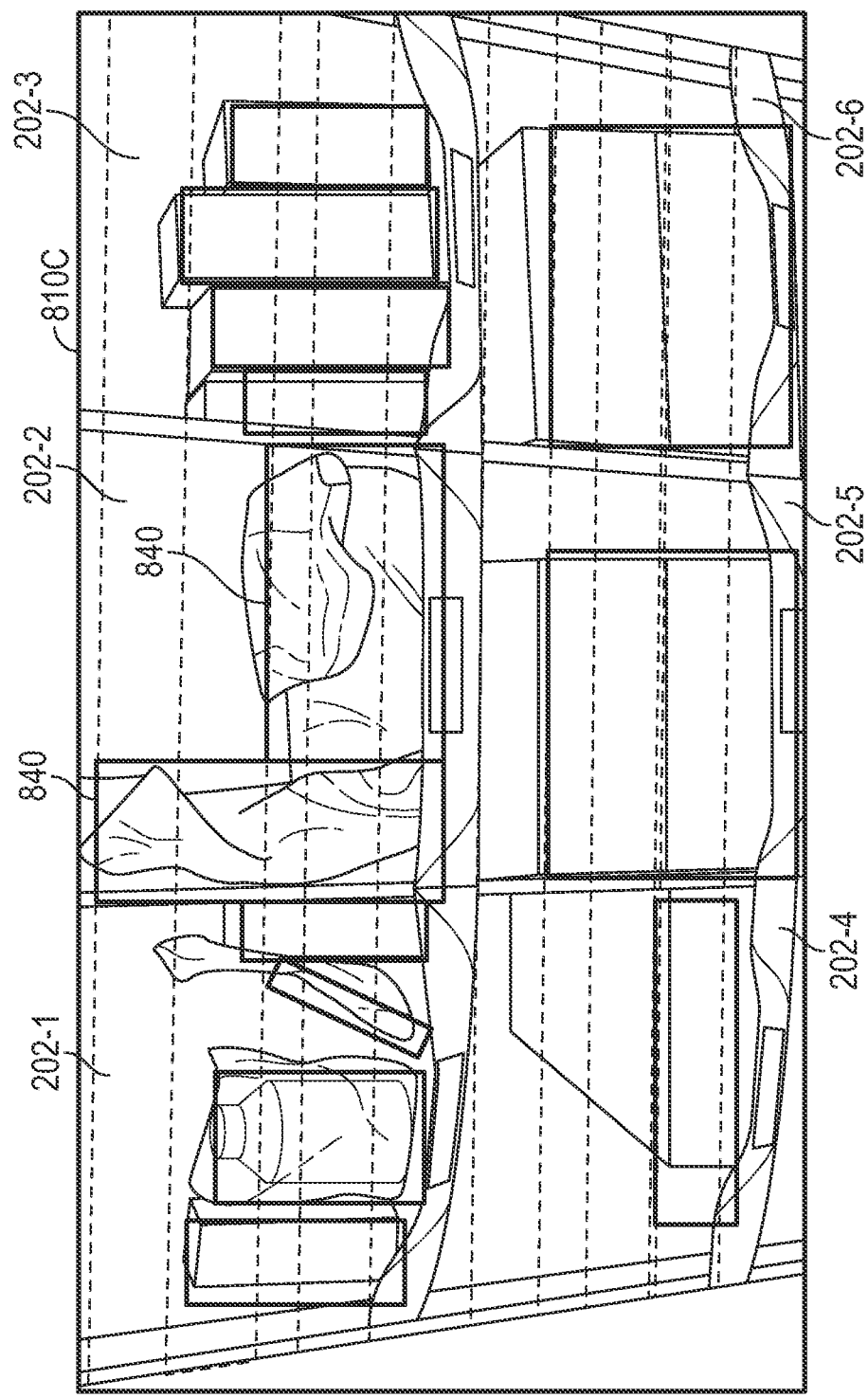

FIGS. 8A-8E illustrate an example sequence of matching items to containers as part of a robotic stowing operation, according to various embodiments. Starting with FIG. 8A, given an image 810A of multiple containers 202 1-6, the stow system can identify an occupied space 820 and unoccupied space 830 within each container 202 1-6, as shown in the image 810B in FIG. 8B. In one embodiment, the stow system can perform instance segmentation on the image 810B to determine instances 840 of the (stowed) items within the occupied space of each container 202 1-6, as shown in the image 810C in FIG. 8C.

Figure 8D:
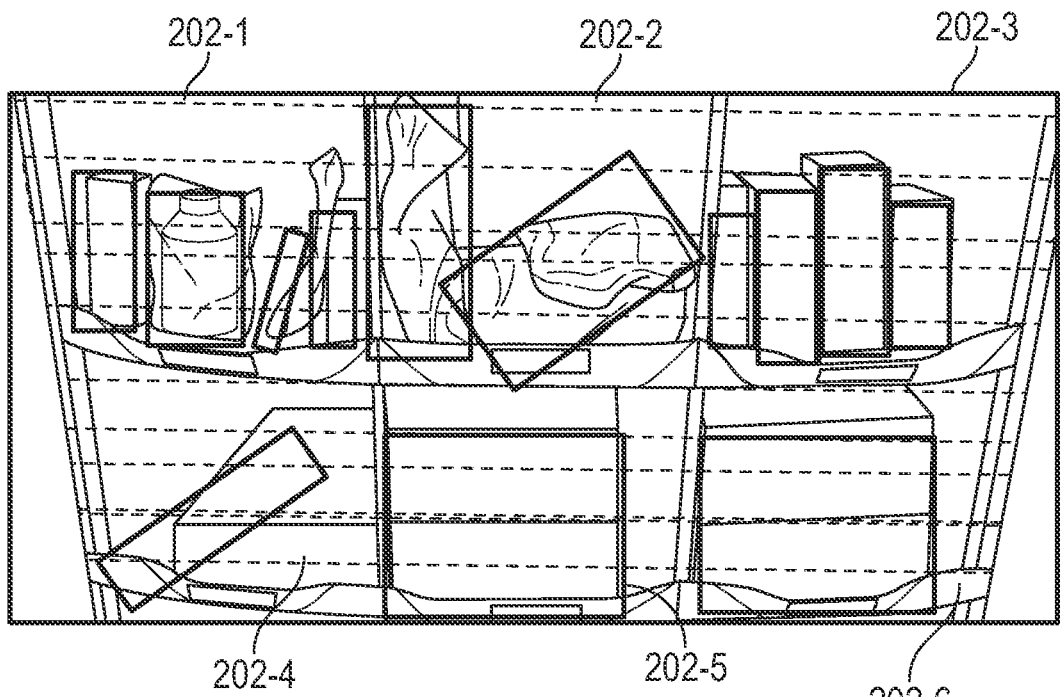
Figure 8E:
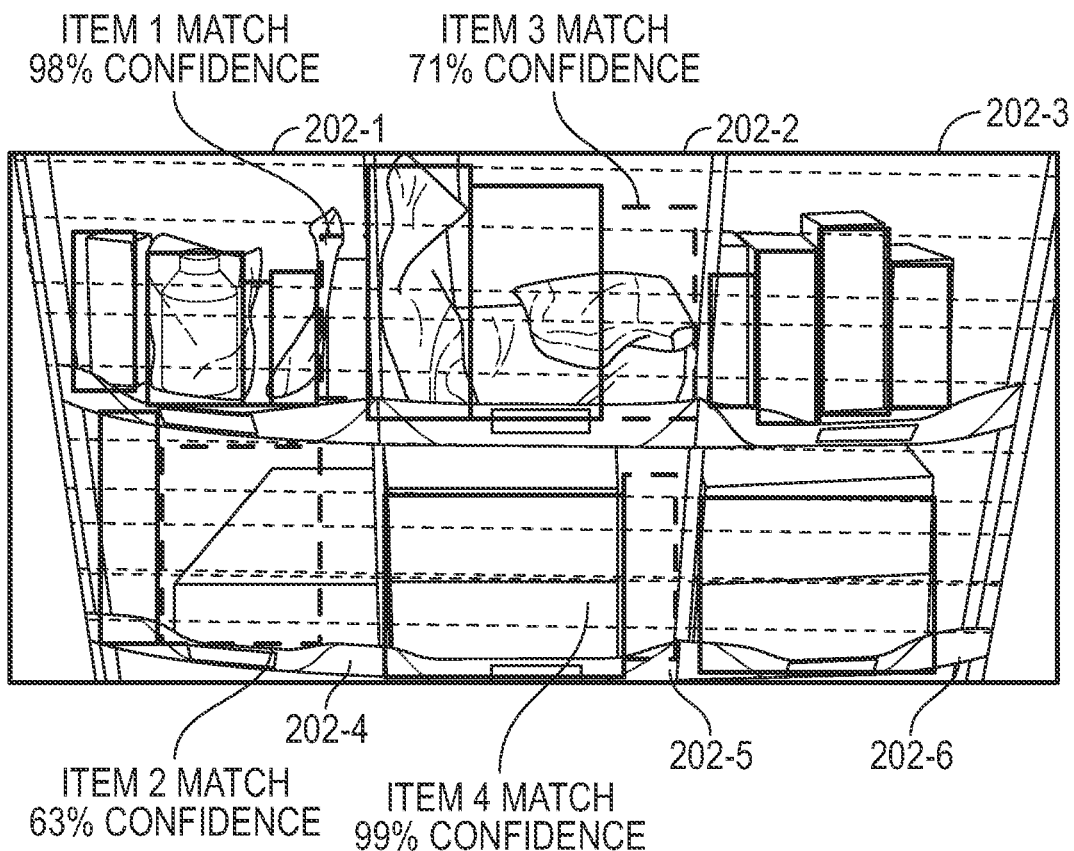

In one embodiment, the stow system can determine a motion strategy for creating space in one or more of the containers 202 1-6, based on the attributes of the item waiting to be stowed, attributes of the items in the respective container, and amount of occupied/unoccupied space. As shown in FIG. 8D, for example, the stow system may predict that using a bin sweep motion in container 202-1 can create space in container 202-1, using a page turn motion in container 202-2 can create space in container 202-2, and using a page turn motion in container 202-4 can create space in container 202-4. The stow system may then match one or more items to the containers and generate a confidence score associated with the match. For example, as shown in FIG. 8E, the stow system can match a first item to container 202-1 with 98% confidence, match a second item to container 202-4 with 63% confidence, match a third item to container 202-2 with 71% confidence, and match a fourth item to container 202-5 with 99% confidence. In some embodiments, the stow system may match the first, second, third, and fourth items to the containers 202-1, 202-4, 202-2, and 202-5, respectively, such that the confidence score for each matched item is maximized across the first, second, third, and fourth items.

In some embodiments, the motion strategy may also indicate a type of contact the stow system is to make with any items already stowed in the container. For example, the type of contact may include a "non-contact" stow, a "floating contact" stow, a "fixed contact" stow, or a "flexible contact" stow.

Figure 9A:
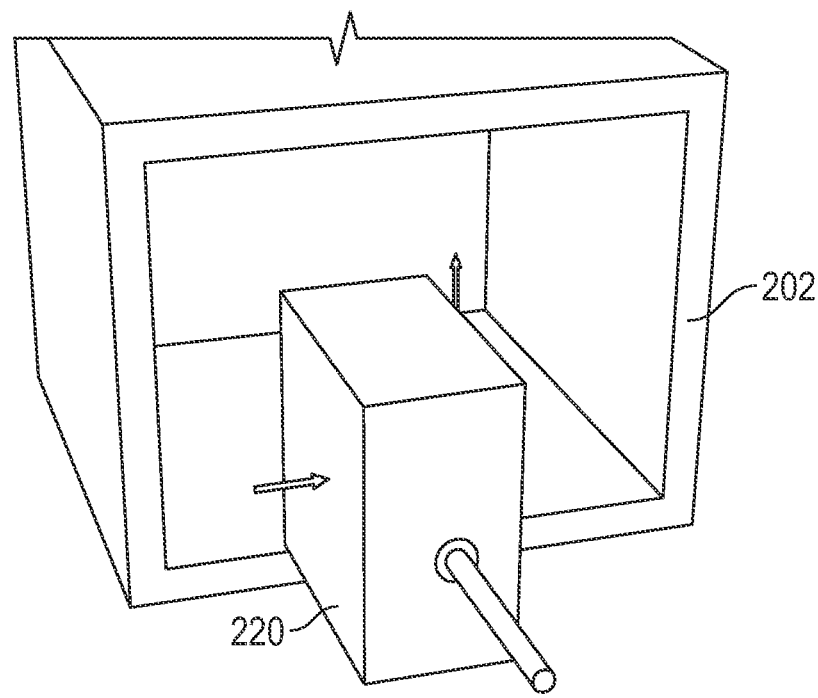
FIGS. 9A-9B illustrate an example sequence of stowing an item into a container, according to one embodiment.
Figure 9B:
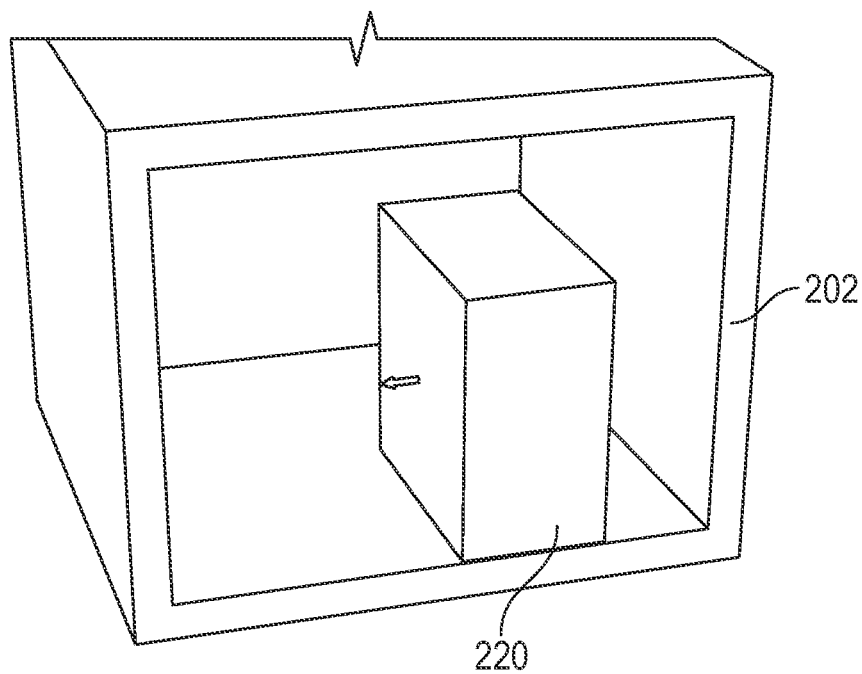

FIGS. 9A-9B illustrate an example sequence of stowing an item 220 using a "non-contact" stow, according to one embodiment. The "non-contact" stow may be used when the container 202 is empty (e.g., as shown in FIG. 9A) or when the container includes one or more stowed items (not shown).

Figure 10A:
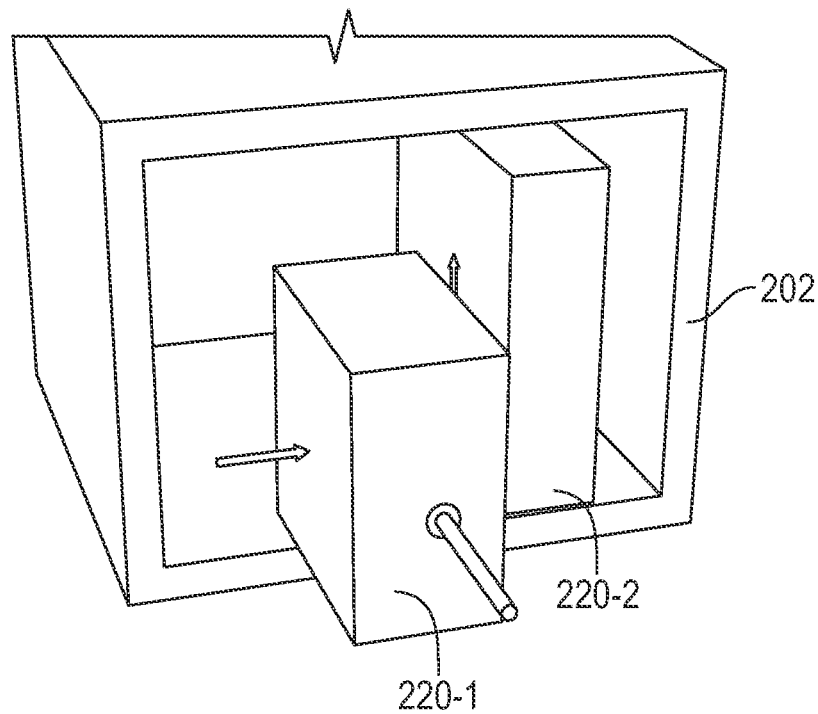
FIGS. 10A-10B illustrate another example sequence of stowing an item into a container, according to one embodiment.
Figure 10B:
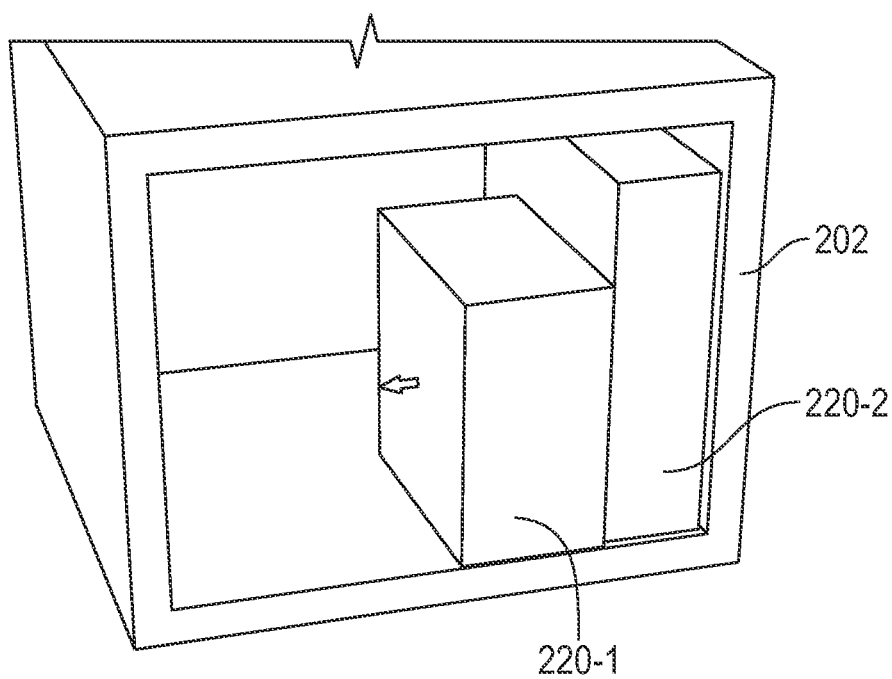

FIGS. 10A-10B illustrate an example sequence of stowing an item 220-1 using a "floating contact" stow, according to one embodiment. Here, the item 220-1 makes contact with the item 220-2 as the item 220-1 is inserted into the container 202 (FIG. 10A). The stow system then applies a force to the item 220-1 (e.g., using a sweep motion) to slide the items 220 1-2 to one side of the container 202 (FIG. 10B).

Figure 11A:
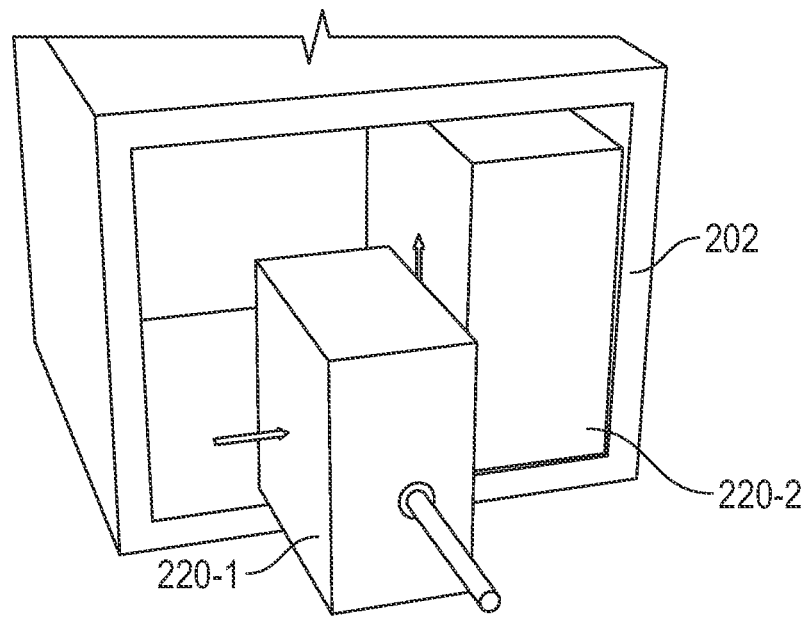
FIGS. 11A-11B illustrate another example sequence of stowing an item into a container, according to one embodiment.
Figure 11B:
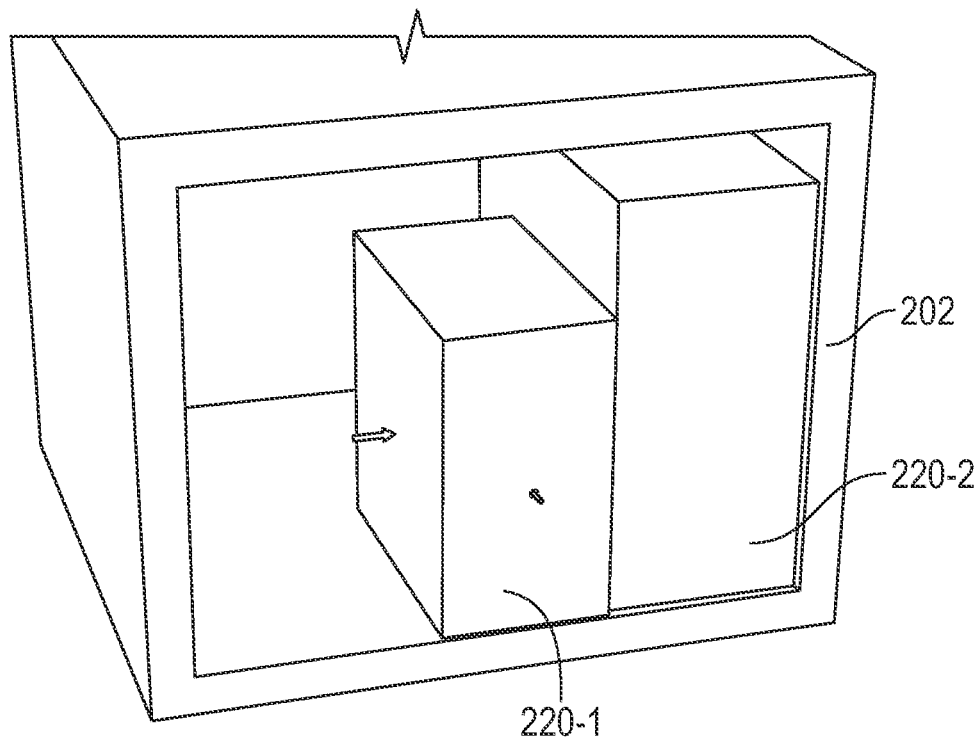

FIGS. 11A-11B illustrate an example sequence of stowing an item 220-1 using a "fixed contact" stow, according to one embodiment. Here, the item 220-1 makes contact with the item 220-2 as the item 220-1 is inserted into the container 202 (FIG. 11A). Compared to the scenario depicted in FIG. 10B, in FIG. 11B, the stow system may refrain from applying a force to the item 220-1.

Figure 12A:
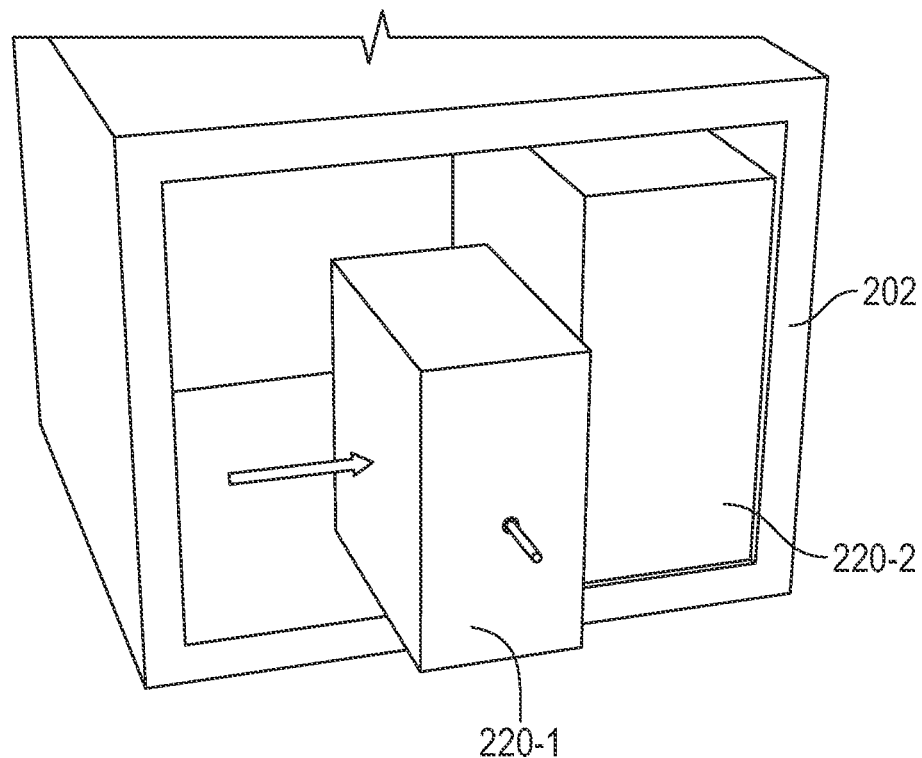
FIGS. 12A-12B illustrate another example sequence of stowing an item into a container, according to one embodiment.
Figure 12B:
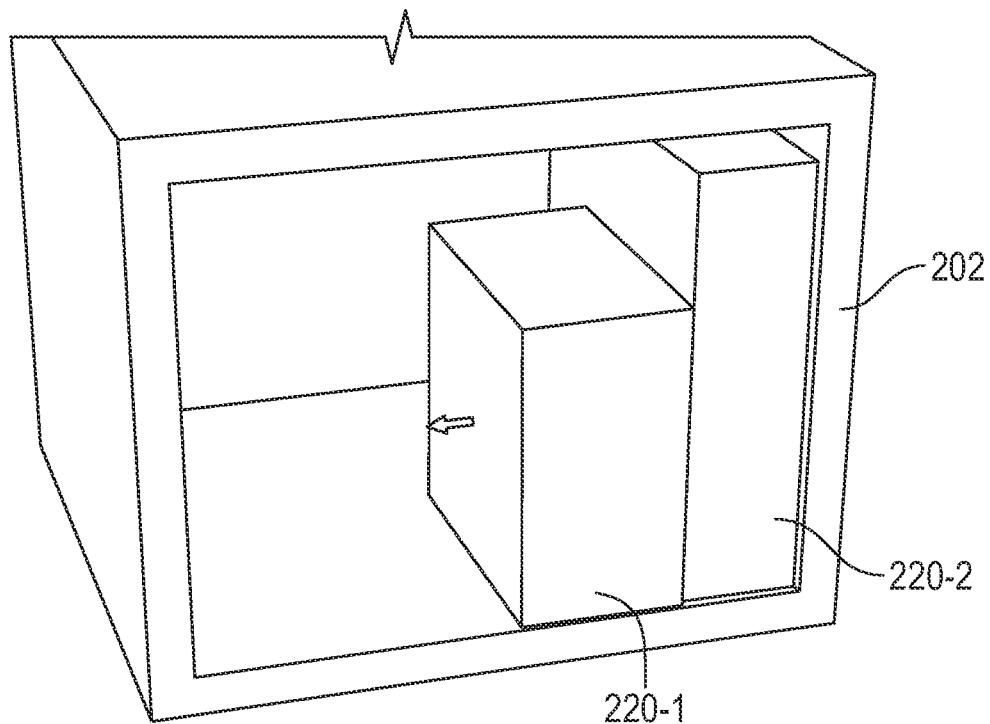

FIGS. 12A-12B illustrate an example sequence of stowing an item 220-1 using a "flexible contact" stow, according to one embodiment. Here, the item 220-1 makes contact with the item 220-2 as the item 220-1 is inserted into the container 202 (FIG. 12A). In FIG. 12B, the stow system applies a force to the item 220-1, which in turn compresses the item 220-2. In some cases, the "flexible contact" stow may be used when one or more stowed items are compressible (e.g., t-shirts, bubble-wrapped packages, etc.).

Figure 13:
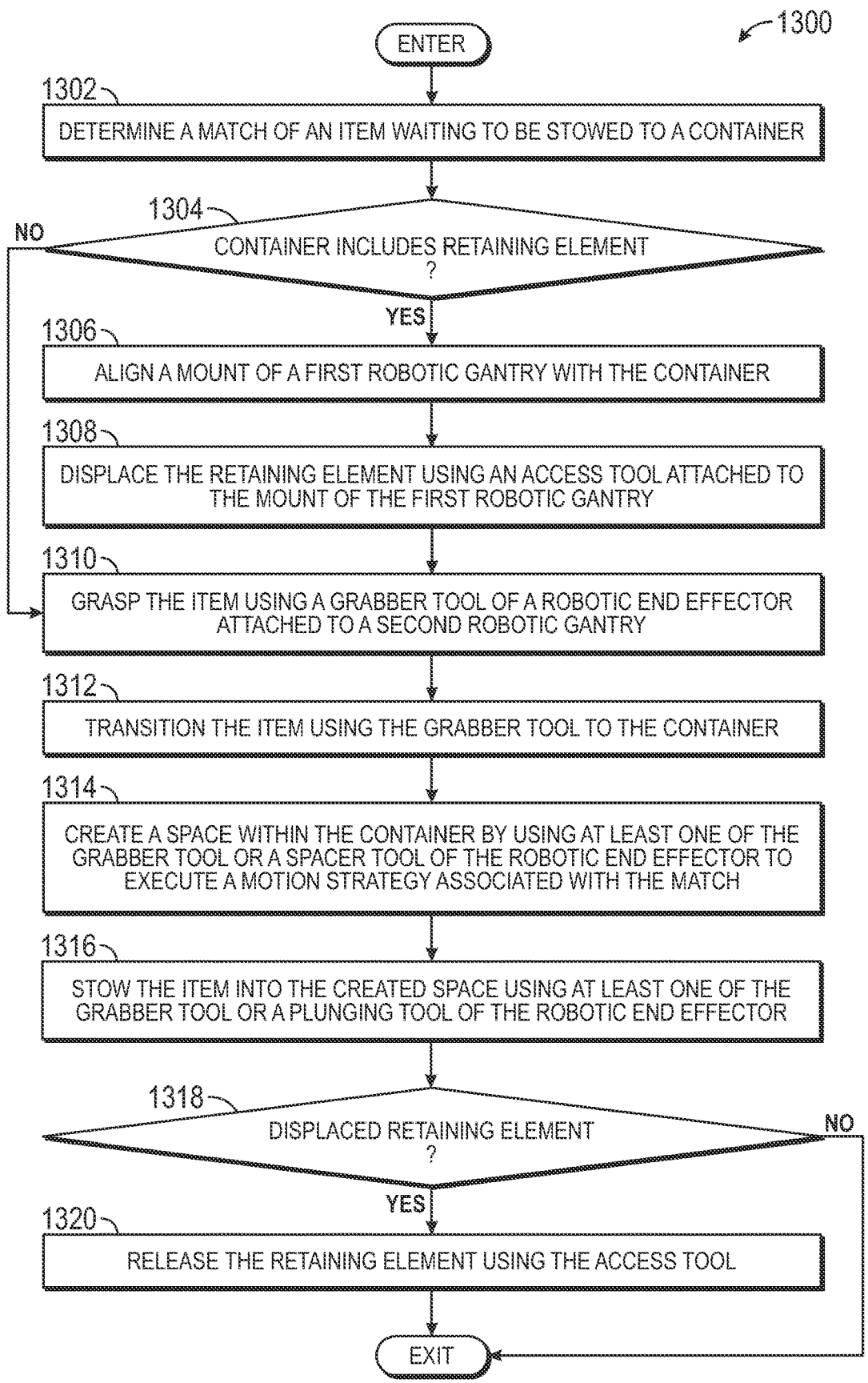
FIG. 13 is a flowchart of another method for performing a robotic stow operation, according to one embodiment.

FIG. 13 is a flowchart of a method 1300 for performing a robotic stow operation, according to one embodiment. The method 1300 may be performed by one or more components of a robotic workcell (e.g., robotic workcell 150). In one embodiment, the method 1300 is performed by a controller 240 sending instructions (or commands) to one or more components (e.g., gantries, tools, end effectors, robotic end effector, etc.) of a stow system (e.g., stow system 180). The method 1300 may be performed for each iteration of a robotic stow cycle (e.g., for each item that is waiting to be stowed).

Figure 14A:
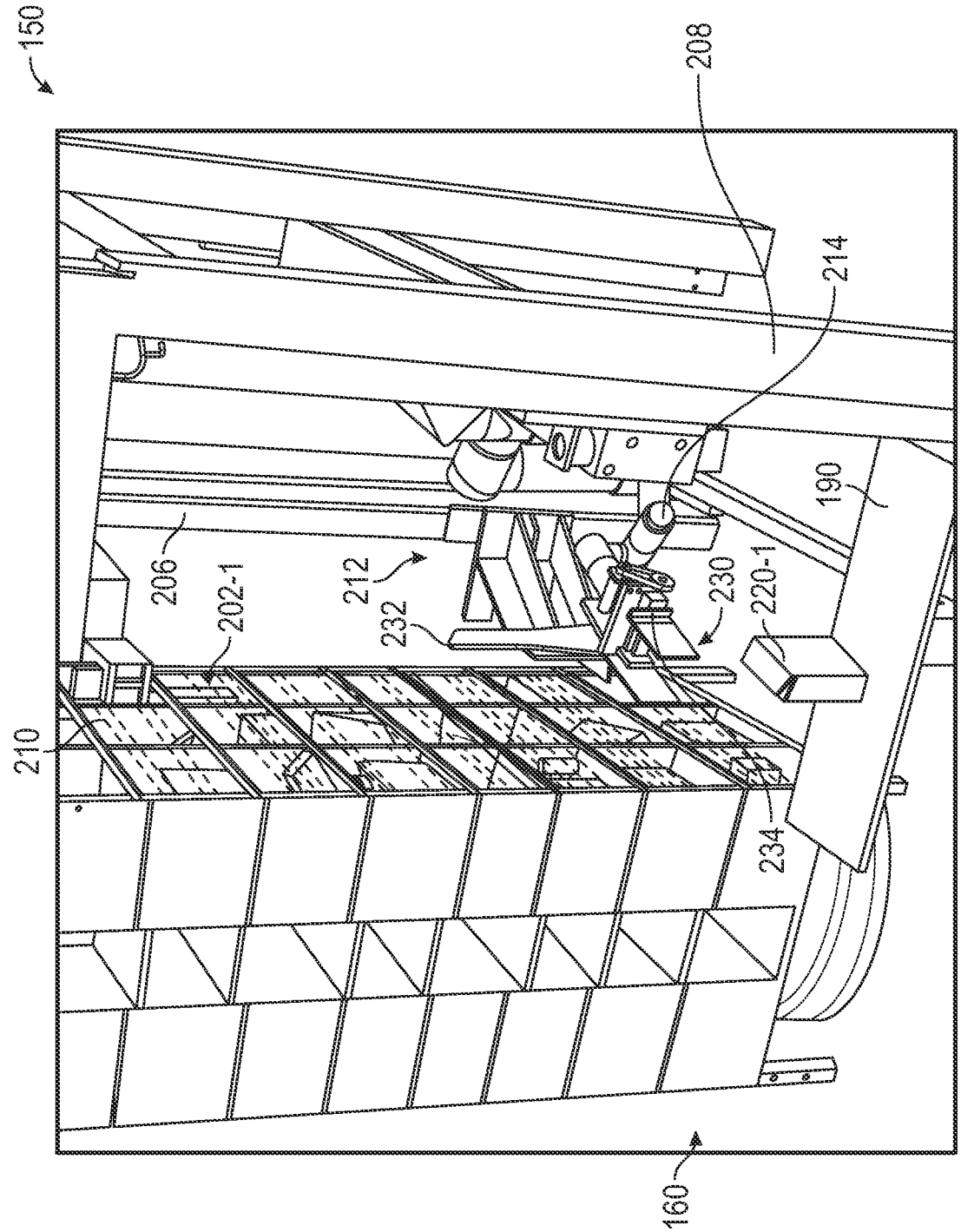
FIGS. 14A-H illustrate an example sequence for a robotic stowing operation, according to various embodiments.

Method 1300 may enter at block 1302 where the stow system determines a match of an item (e.g., item 220) waiting to be stowed to a container (e.g., container 202) of multiple containers. As shown in FIG. 14A, for example, the stow system may determine to match the item 220-1 in the holding area 190 to the container 202-1 of the inventory holder 160.

Figure 14B:
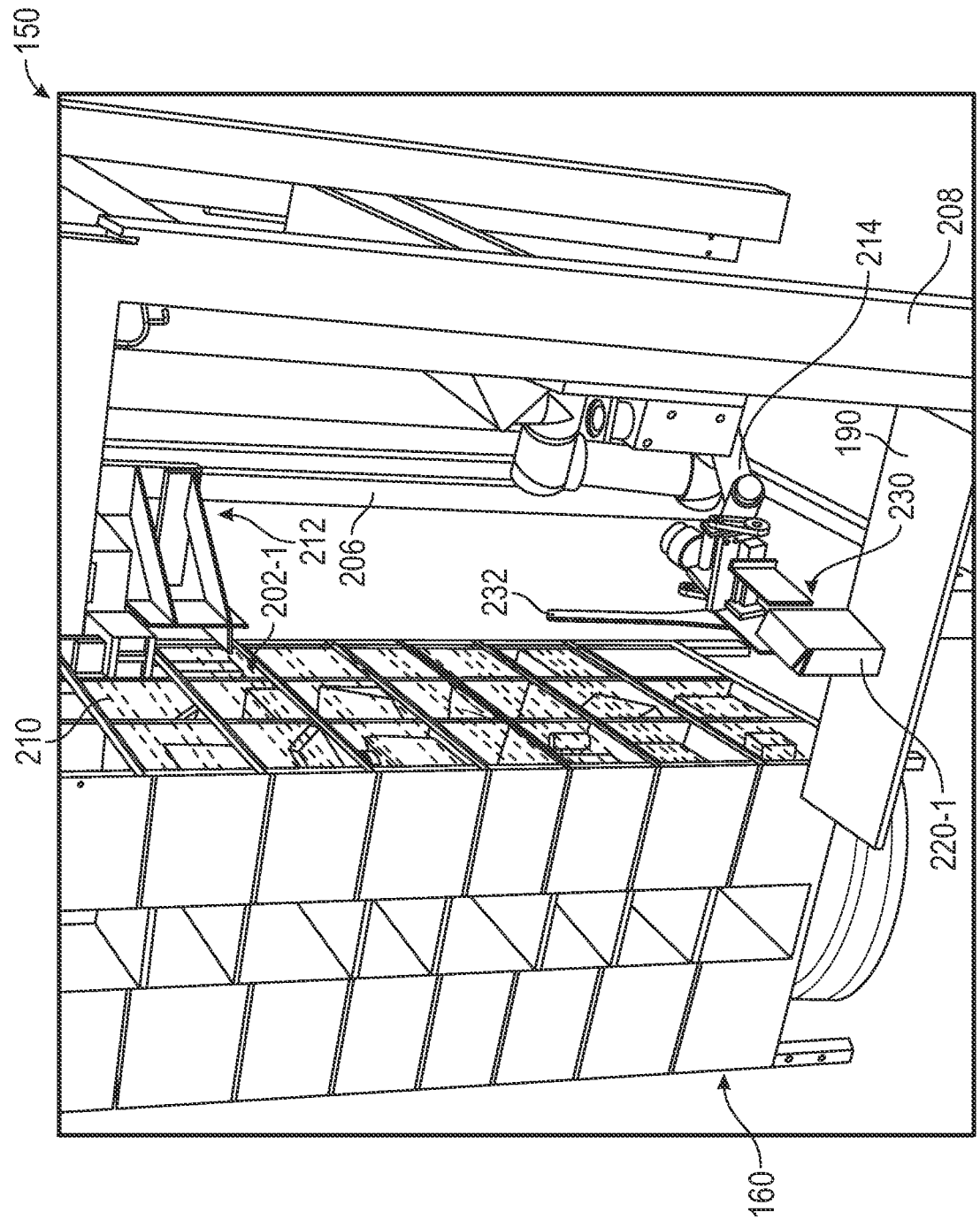
Figure 14C:
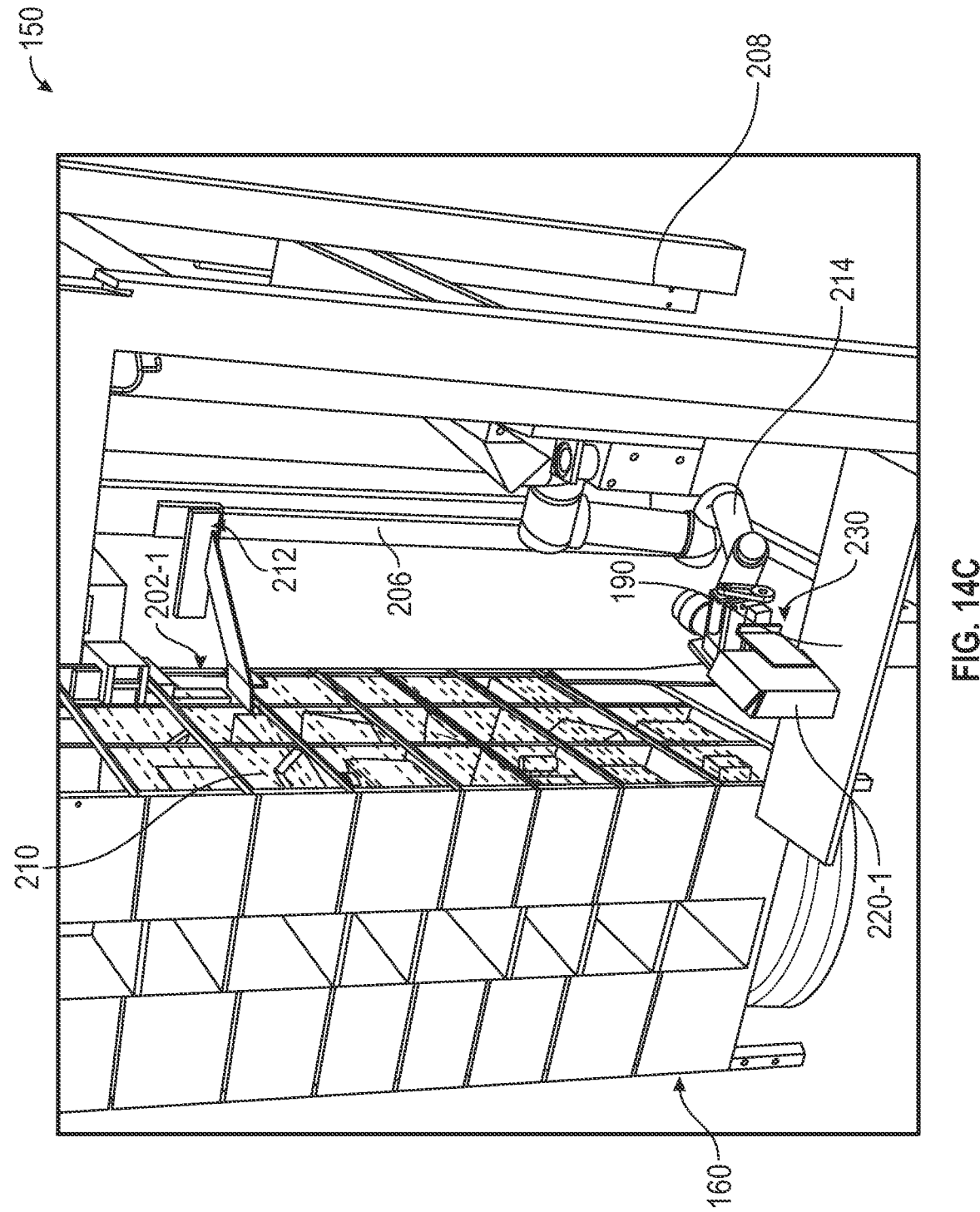

At block 1304, the stow system determines whether the container includes a retaining element (e.g., retaining element 210). If so, then the stow system aligns a mount (e.g., mount 260) of a first robotic gantry (e.g., robotic gantry 206) with the container (block 1306). As shown in FIG. 14B, for example, the robotic gantry 206 aligns the access tool 212 with the selected container 202-1 of the inventory holder 160. At block 1308, the stow system displaces the retaining element using an access tool (e.g., access tool 212) attached to the mount of the first robotic gantry, e.g., as shown in FIG. 14C. On the other hand, if the stow system determines the container does not include a retaining element, then the method proceeds to block 1310.

Figure 14D:

At block 1310, the stow system grasps the item using a grabber tool (e.g., grabber tool 230) of a robotic end effector (e.g., robotic end effector 214) attached to a second robotic gantry (e.g., robotic gantry 208). As shown in FIG. 14C, for example, the grabber tool 230 (configured with two plates) grasps the item 220-1 by engaging the item 220-1 between the two plates of the grabber tool 230. At block 1312, the stow system transitions the item using the grabber tool to the container. As shown in FIG. 14D, for example, the grabber tool 230 transitions the item 220-1 to the container 202-1, which includes stowed item 220-2 and stowed item 220-3.

Figure 14E:
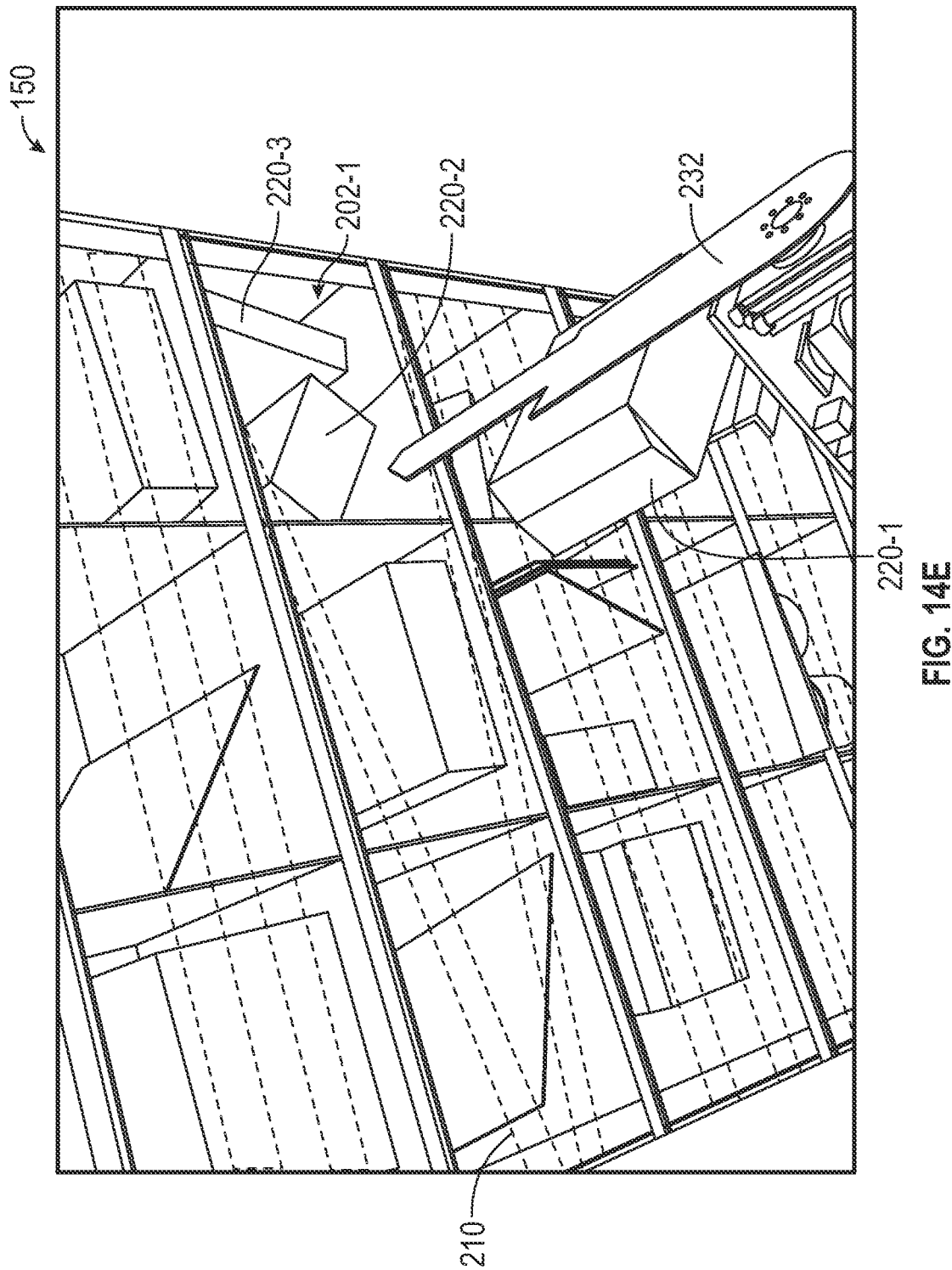
Figure 14F:
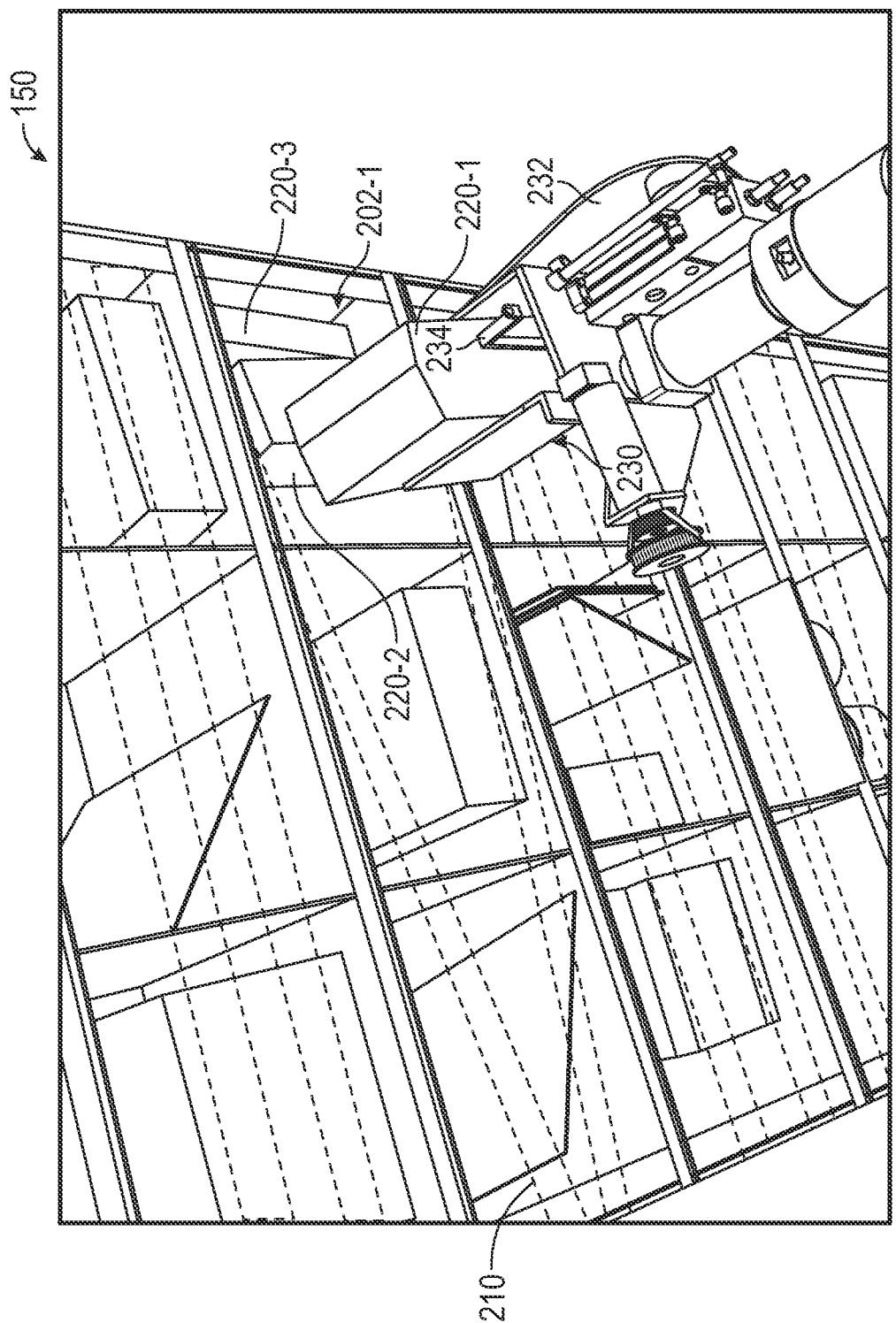

At block 1314, the stow system creates a space within the container by using at least one of the grabber tool or a spacer tool (e.g., spacer tool 232) of the robotic end effector to execute a motion strategy associated with the match. In one reference example shown in FIGS. 14E-14F, the stow system uses the spacer tool 232 to rearrange the items 220 2-3 from a slanted configuration (FIG. 14E) to a vertical configuration (FIG. 14F).

Figure 14G:
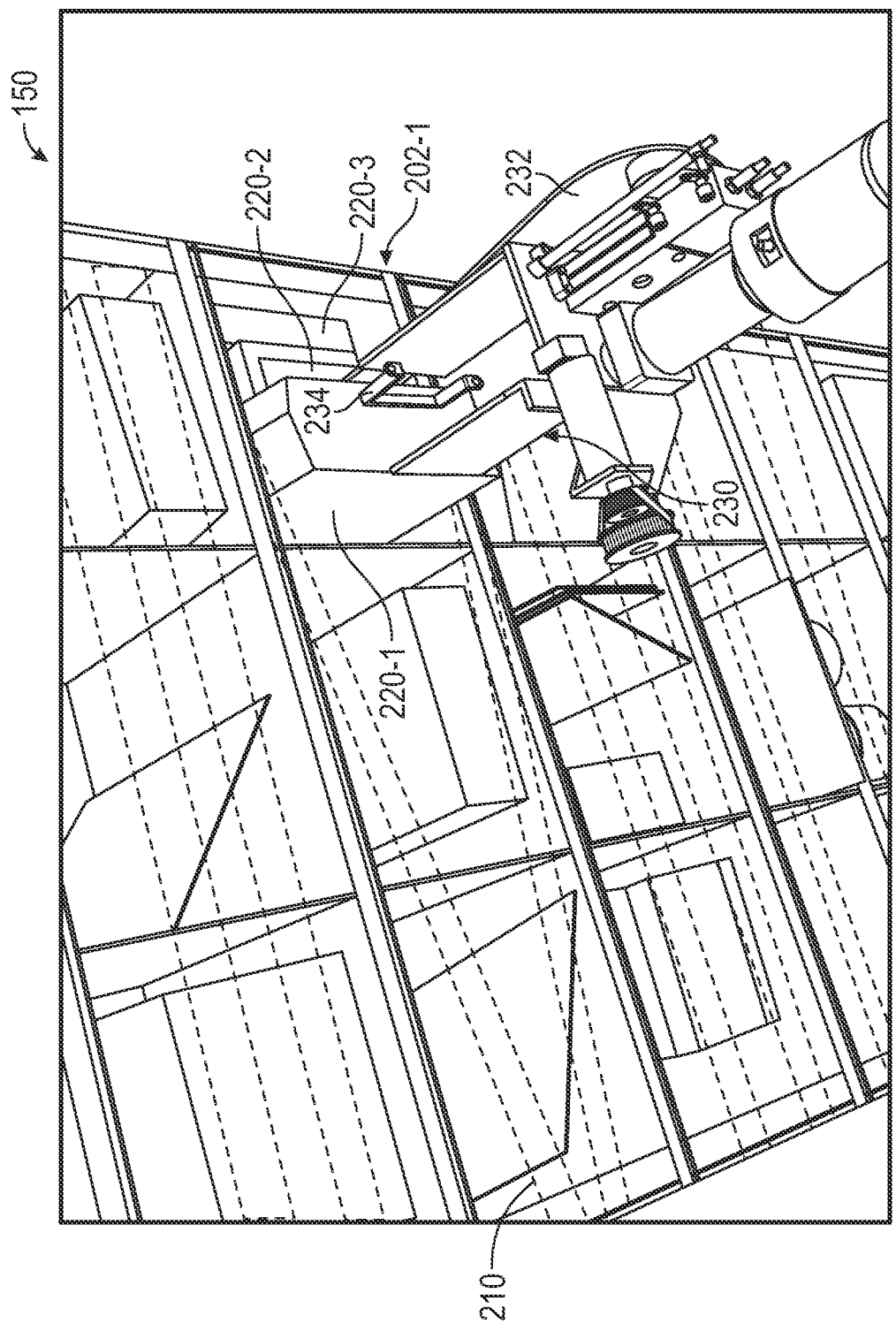
Figure 14H:
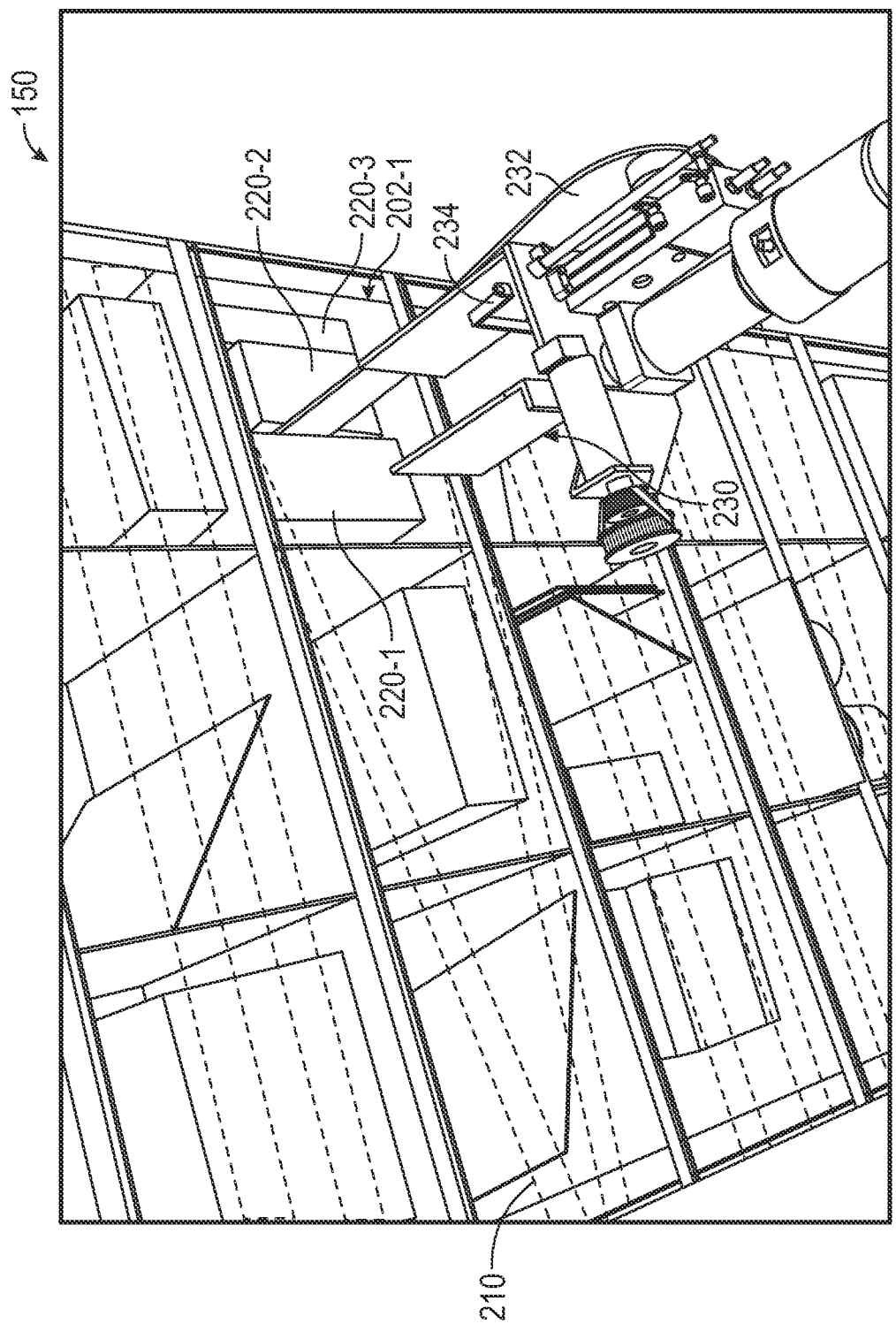

At block 1316, the stow system stows the item into the created space using at least one of the grabber tool or a plunging tool (e.g., plunging tool 234) of the robotic end effector. In one reference example shown in FIG. 14G, the stow system uses the plunging tool 234 to push the item 220-1 into the space created with the spacer tool 232. After stowing the item 220-1, the stow system retracts the plunging tool 234 (FIG. 14H). At block 1318, the stow system determines whether the container includes a displaced retaining element. If so, then the stow system releases the retaining element using the access tool (block 1320), and the method 1300 may exit. If not, then the method 1300 may exit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A robotic workcell comprising:
  a rack comprising a plurality of containers, wherein each container is configured to hold one or more items;

a holding area comprising an item waiting to be stowed into one of the plurality of containers; and a robotic stow system comprising:
- a first robotic gantry comprising a first mount and at least one robotic end effector attached to the first mount, wherein the at least one robotic end effector comprises a grabber tool and a spacer tool; and
- a second robotic gantry disposed between the first robotic gantry and the rack, the second robotic gantry comprising a second mount and an access tool attached to the second mount, wherein:
  - the second robotic gantry is configured to align the second mount with a first container comprising a first set of items;
  - after the second mount is aligned with the first container, the access tool is configured to displace a retaining element securing the first set of items in the first container;
  - the at least one robotic end effector is configured to align the grabber tool and the spacer tool with the first container;
  - after (i) the grabber tool and the spacer tool are aligned with the first container and (ii) the retaining element is displaced, the spacer tool is configured to create a space for the item waiting to be stowed in the first container by rearranging the first set of items; and
  - the grabber tool is configured to stow the item into the space that is created in the first container.

2. The robotic workcell of claim 1, wherein:
the first robotic gantry is configured to move the first mount in a first two-dimensional (2D) plane established by the first robotic gantry; and
the second robotic gantry is configured to move the second mount in a second 2D plane established by the second robotic gantry.

3. The robotic workcell of claim 2, wherein the first mount and the second mount are independently movable within the first 2D plane and the second 2D plane, respectively.

4. The robotic workcell of claim 2, wherein:
the first robotic gantry is configured to move the first mount to a position in the first 2D plane; and
the first container is accessible to the at least one robotic end effector when the first mount is at the position.

5. The robotic workcell of claim 1, wherein:
the at least one robotic end effector further comprises a plunging tool attached to the grabber tool; and
the plunging tool is configured to push the item waiting to be stowed into the space that is created in the first container.

6. A stow system comprising:
one or more perception sensors;
a first robotic gantry comprising a first mount and a robotic end effector attached to the first mount;
a second robotic gantry disposed between the first robotic gantry and a plurality of containers, the second robotic gantry comprising a second mount and a first end effector attached to the second mount; and
a controller configured to perform operations comprising:
  analyzing an environment in each of the plurality of containers using the one or more perception sensors, wherein analyzing the environment in each of the plurality of containers comprises, for each container:
    determining one or more attributes of a second item in the container; and
    determining an amount of unoccupied space in the container;
  selecting a first container of the plurality of containers in which to stow a first item, based in part on the analysis of the environment in each of the plurality of containers;
  determining, for each container, (i) a motion strategy for creating space in the container with at least one second end effector attached to the robotic end effector, and (ii) a confidence score associated with the motion strategy, based at least in part on the amount of unoccupied space, the one or more attributes of the second item in the container, and one or more attributes of the first item;
  generating a motion plan for stowing the first item into the first container, based in part on the analysis of the environment in the first container and the confidence score associated with the motion strategy determined for the first container of the plurality of containers; and
  controlling movement of the first mount, the second mount, and the robotic end effector, based on the motion plan.

7. The stow system of claim 6, wherein the one or more attributes of the second item comprises at least one of: (i) a weight of the second item, (ii) dimensions of the second item, (iii) a type of the second item, or (iv) an arrangement of the second item.

8. The stow system of claim 6, wherein selecting the first container of the plurality of containers comprises selecting, from the plurality of containers, the container having the motion strategy with the highest confidence score as the first container.

9. The stow system of claim 6, wherein:
the motion strategy defines a motion of the at least one second end effector for rearranging the second item in the container from a first configuration to a second configuration; and
an amount of unoccupied space in the container with the second item in the second configuration is greater than the amount of unoccupied space in the container with the second item in the first configuration.

10. The stow system of claim 6, wherein the motion plan for stowing the first item into the first container is based in part on the motion strategy determined for the first container.

11. The stow system of claim 10, wherein controlling movement of the first mount, the second mount, and the robotic end effector comprises:
controlling the first robotic gantry to move the first mount to a first position in a two-dimensional (2D) plane where the first container is accessible to the at least one second end effector of the robotic end effector; and
controlling the at least one second end effector to insert the first item into the first container using the motion strategy.

12. The stow system of claim 11, wherein:
controlling movement of the first mount, the second mount, and the robotic end effector comprises controlling the second robotic gantry to align the second mount with the first container; and
the operation further comprises controlling the first end effector to displace a retaining element securing the second item in the first container.

13. The stow system of claim 12, wherein the at least one second end effector is controlled to insert the first item into the first container after the retaining element is displaced.

14. The stow system of claim 6, wherein controlling movement of the first mount, the second mount, and the robotic end effector comprises coordinating a motion of the first mount, a motion of the second mount, and a motion of the robotic end effector.

15. The stow system of claim 6, wherein controlling movement of the first mount, the second mount, and the robotic end effector comprises independently controlling a motion of the first mount, a motion of the second mount, and a motion of the robotic end effector.

16. A computer-implemented method for performing a robotic stowing operation, the computer-implemented method comprising:
    analyzing an environment in each of a plurality of containers, based on sensor data captured by one or more perception sensors;
    selecting a first container of the plurality of containers in which to stow a first item, based in part on the analysis of the environment in each of the plurality of containers;
    determining, for each container, (i) a motion strategy for creating space in the container with at least one second end effector attached to the robotic end effector, and (ii) a confidence score associated with the motion strategy, based at least in part on the amount of unoccupied space, the one or more attributes of the second item in the container, and one or more attributes of the first item;
    generating a motion plan for stowing the first item into the first container, based in part on the analysis of the environment in the first container and the confidence score associated with the motion strategy determined for the first container of the plurality of containers; and
    controlling a first robotic gantry, a second robotic gantry, and a robotic end effector, based on the motion plan.

17. The computer-implemented method of claim 16, wherein:
    the first robotic gantry comprises a first mount;
    the robotic end effector is attached to the first mount;
    the second robotic gantry is disposed between the first robotic gantry and the plurality of containers; and
    the second robotic gantry comprises a second mount and a first end effector attached to the second mount.

18. The computer-implemented method of claim 17, wherein:
    the motion plan comprises the motion strategy for creating space within the first container by rearranging a second item in the first container; and
    controlling the first robotic gantry, the second robotic gantry, and the robotic end effector comprises controlling a second end effector attached to the robotic end effector to insert the first item into the first container using the motion strategy.

* * * * *